(12) United States Patent
Marsten et al.

(10) Patent No.: US 9,558,165 B1
(45) Date of Patent: Jan. 31, 2017

(54) METHOD AND SYSTEM FOR DATA MINING OF SHORT MESSAGE STREAMS

(75) Inventors: Roy Marsten, Atlanta, GA (US); Russell Caldwell, Atlanta, GA (US); Radhika Subramanian, Atlanta, GA (US)

(73) Assignee: EMICEN CORP., Atlanta, GA (US)

( * ) Notice: Subject to any disclaimer, the term of this patent is extended or adjusted under 35 U.S.C. 154(b) by 644 days.

(21) Appl. No.: 13/589,147

(22) Filed: Aug. 19, 2012

Related U.S. Application Data

(60) Provisional application No. 61/525,664, filed on Aug. 19, 2011.

(51) Int. Cl.
*G06F 17/27* (2006.01)
*G06F 17/21* (2006.01)
*G06F 17/24* (2006.01)

(52) U.S. Cl.
CPC ..................... *G06F 17/24* (2013.01)

(58) Field of Classification Search
None
See application file for complete search history.

(56) References Cited

U.S. PATENT DOCUMENTS

| | | | | |
|---|---|---|---|---|
| 8,046,363 B2* | 10/2011 | Cha | ..................... | G06F 17/3071 707/739 |
| 8,145,636 B1* | 3/2012 | Jeh | ..................... | G06F 17/30707 707/736 |
| 8,166,032 B2* | 4/2012 | Sommer | ............. | G06F 17/3071 707/736 |
| 8,200,695 B2* | 6/2012 | Cha | ................... | G06F 17/30663 707/748 |
| 8,290,975 B2* | 10/2012 | Gao | ..................... | G06F 17/3064 707/705 |
| 8,805,840 B1* | 8/2014 | Joshi | ................. | G06F 17/30707 707/737 |
| 8,868,560 B2* | 10/2014 | Spivack | ................. | G06Q 30/02 706/47 |
| 2004/0102957 A1* | 5/2004 | Levin | ................. | G06F 17/2735 704/3 |
| 2004/0267887 A1* | 12/2004 | Berger | ................ | G06Q 10/109 709/206 |
| 2005/0251384 A1* | 11/2005 | Yang | ....................... | G06F 17/26 704/10 |

(Continued)

*Primary Examiner* — Richemond Dorvil
*Assistant Examiner* — Thuykhanh Le
(74) *Attorney, Agent, or Firm* — Smith Tempel; Steven P. Wigmore

(57) ABSTRACT

A method and system for summarizing messages from a message stream is disclosed in which association analysis is applied to stream of short data messages comprising words in a spoken language, such as English. Clusters of words are identified that provide a summary of the several conversations (short data messages originating from different human sources) that are imbedded in the message stream. Each word cluster may represent a set of messages that are its instances. The word clusters may collectively constitute a summary of the entire message stream. The word clusters that have been extracted from message stream may also be grouped into topics. Also, an identity of one or more message originators may be listed based on their influence on the messages being analyzed. The short data messages may also be sorted based on a geographical location of one or more originators of messages.

20 Claims, 28 Drawing Sheets

(56) References Cited

U.S. PATENT DOCUMENTS

| | | | |
|---|---|---|---|
| 2007/0022459 A1* | 1/2007 | Gaebel, Jr. | H04N 7/165 725/114 |
| 2007/0078889 A1* | 4/2007 | Hoskinson | G06F 17/30705 |
| 2007/0129935 A1* | 6/2007 | Uchimoto | G06F 17/2836 704/9 |
| 2007/0156617 A1* | 7/2007 | Szummer | G06K 9/00409 706/20 |
| 2007/0286579 A1* | 12/2007 | Murabayashi | G11B 27/28 386/241 |
| 2008/0040272 A1* | 2/2008 | Eskin | F25D 29/00 705/41 |
| 2008/0109399 A1* | 5/2008 | Liao | G06F 17/30719 |
| 2008/0140348 A1* | 6/2008 | Frank | G06F 17/3061 702/181 |
| 2008/0243811 A1* | 10/2008 | He | G06F 17/30616 |
| 2008/0275849 A1* | 11/2008 | Basu | G06Q 30/02 |
| 2010/0070448 A1* | 3/2010 | Omoigui | H01L 27/1463 706/47 |
| 2010/0268711 A1* | 10/2010 | Liao | G06F 17/30719 707/736 |
| 2010/0268716 A1* | 10/2010 | Degaugue | G06F 17/30731 707/741 |
| 2010/0293179 A1* | 11/2010 | Chaudhuri | G06F 17/30864 707/759 |
| 2011/0060996 A1* | 3/2011 | Alberth, Jr. | H04L 12/587 715/736 |
| 2011/0131213 A1* | 6/2011 | Wu | G06F 17/30684 707/741 |
| 2011/0196859 A1* | 8/2011 | Mei | G06F 17/30554 707/723 |
| 2011/0276396 A1* | 11/2011 | Rathod | G06F 17/30867 705/14.49 |
| 2011/0276555 A1* | 11/2011 | Fiero | G06F 17/30864 707/706 |
| 2012/0004904 A1* | 1/2012 | Shin | G06F 17/30705 704/9 |
| 2012/0059790 A1* | 3/2012 | Clemencon | G06N 5/02 706/55 |
| 2012/0102037 A1* | 4/2012 | Ozonat | G06F 17/30675 707/738 |
| 2012/0150972 A1* | 6/2012 | Morris | G06Q 50/00 709/206 |
| 2012/0240062 A1* | 9/2012 | Passmore | H04L 12/588 715/758 |
| 2013/0273976 A1* | 10/2013 | Rao | H04L 12/1822 455/563 |
| 2014/0129942 A1* | 5/2014 | Rathod | H04N 21/44222 715/720 |

* cited by examiner

METHOD AND SYSTEM FOR DATA MINING OF SHORT MESSAGE STREAMS

PRIORITY AND RELATED APPLICATIONS STATEMENT

This patent application is claims priority under 35 U.S.C. §119(e) to U.S. Provisional Patent Application Ser. No. 61/525,664 filed on Aug. 19, 2011, entitled, "METHOD AND SYSTEM FOR DATA MINING WITH SHORT MESSAGE STREAMS." The entire contents of this patent application are hereby incorporated by reference.

FIELD OF THE INVENTION

The present invention relates to a method and system of data mining and, more particularly, to a method and system which uses association analysis to identify word clusters in streams of short messages. These clusters, with their associated instances, constitute a high-level summary of the stream of messages.

DESCRIPTION OF THE RELATED ART

Data mining is a technology used to discover patterns and relationships in data. One branch of data mining is known as association analysis, also referred to as market basket analysis. In market basket analysis, the data includes a stream of actual market baskets, or more accurately, it includes representations of actual market baskets. Imagine a sequence of grocery store shopping carts. Each cart contains a selection of items from the grocery store. For example, such items could include bread, milk, eggs, and ice cream. The purpose of association analysis is to find patterns in the purchases. The standard (but apocryphal) example is beer and diapers.

An interpretation of this beer and diaper data is that beer and diapers are often bought together because when dads are sent to the store to buy diapers they take the opportunity to also pick up some beer. The patterns may include clusters of items that are frequently bought together. The patterns, which are called "frequent itemsets", may have any number of items: 2, 3, 4, or more. The criterion for "frequently" usually has to be specified.

An algorithm, referred to as the "a priori algorithm" may be used to find frequent itemsets of various sizes. Association analysis may then proceed to a second stage of recasting the itemsets as association rules. This involves trying to infer causality.

For example, do people who go to the store for diapers also buy beer, or vice versa? Market basket analysis has been applied to a wide variety of real market baskets (grocery stores, convenience stores, hardware stores, auto part stores, office supplies stores, etc.) as well as to the virtual shopping carts of online Internet stores.

Association analysis discovers useful patterns in shopping cart data. These patterns may be used by store owners in planning their shelf layout, inventory, advertising, and promotions. The streams of data, which are captured by point-of-sale (POS) systems at checkout counters (real and virtual) throughout the country, are enormous. There are terabytes of data captured every day, and the frequent itemsets are a way of summarizing this data in a way that makes it useful.

Meanwhile, there are other torrents of data that go unanalyzed. News stories, text messages, email, and TWITTER™ brand short data messages flood the world daily. This data may be highly perishable. People may struggle to keep up with the subjects from this data that they are interested in.

For example, the TWITTER™ brand system of short data messaging alone may stream over 200 million short messages every day. Short data messaging systems, like the TWITTER™ brand system may comprise a micro-blogging platform that lets its users broadcast 140 character length messages referred to in the industry as "tweets." Each TWITTER™ short data message user may subscribe to a collection of other users (individuals and institutions) in order to receive a variety of short data messages which are publicly broadcasted. Data received by an individual subscriber may reach hundreds or even thousands of short data messages every day.

Most TWITTER™ short data messaging users cannot read all of the short data messages that they receive because of the volume. Their alternatives are to read a random sample of the short data messages, or to use a search engine function to retrieve short data messages that may contain a requested set of key words. A random sample of these short data messages may miss the most important messages.

Keyword searches may be used to find important messages. But the drawback of a key word search is that you have to know what key words to search for, and even then, there may still be far too many messages returned. Thus, there is a need for a method and system for summarizing a stream of short data messages and delivering to a user a high-level summary of the gist or overall summary of the stream of short data messages.

SUMMARY OF THE DISCLOSURE

The inventive system and method may provide a summary of a stream of short data messages. The summary provided may include a collection of word clusters. Each word cluster may be associated with a set of messages that will be referred to as instances of the cluster. To be an instance of a cluster, a message usually must contain every word of the cluster. A particular message may be an instance of more than one cluster.

Each cluster may represent one conversation that is taking place in the stream of messages. An analogy that helps to understand the inventive method and system is to imagine standing near a cocktail party or on the floor of a professional convention. In this example, there may be a dull roar of noise, which may be many human conversations occurring almost simultaneously.

Out of a group of two hundred people there may be at least fifty different conversations on related, overlapping topics. So what is this room of people talking about? The inventive system and method addresses the answer to this question.

Written messages are usually easier to analyze than spoken ones, so the volume of written messages can be much greater. The inventive system and method may be used to analyze TWITTER™ brand short data messages. Such short data messages typically have a maximum length of one-hundred forty characters, which in the English language converts to about 30 words per data message. The inventive system and method may be effective at least up to about two-hundred word length messages.

The inventive method and system may have two main parts. First, association analysis may be used to address where the market baskets are the short data messages and the items within the market basket are the words within the short data messages. A direct application of association analysis to these short data messages will typically not yield useful results. Association analysis typically produces very large numbers of frequent itemsets.

To qualify as a summary for the short data messages analyzed, the inventive system and method may deliver a small number of clusters of words, so that an individual can grasp a sense of the whole stream of short data messages which may include hundred, if not, thousands of short data messages. One important aspect of the inventive system and method includes a way to eliminate redundant clusters of words and ranking the clusters of words by importance.

Therefore, according to exemplary embodiments of the inventive system and method, a second "association rule" phase is usually not employed, while only the first "frequent itemset" phase of the "a priori algorithm" is utilized.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

A computing device of this disclosure may include a computer server, a desktop computer, or other similar hardware devices. Meanwhile, a portable computing device may include a cellular telephone, a pager, a PDA, a smartphone, a navigation device, or a hand-held computer with a wireless connection or link.

Figure 1A:
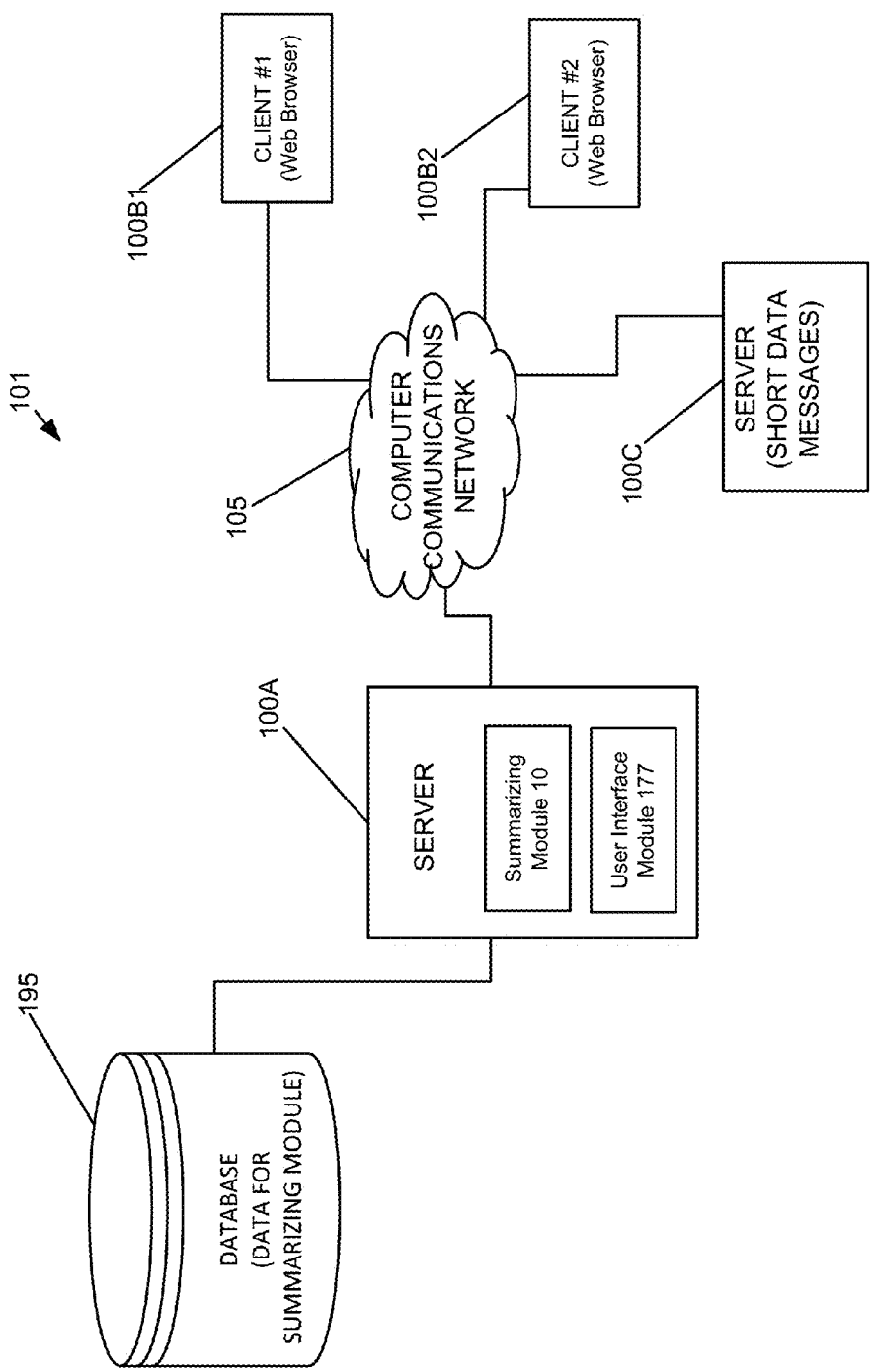
FIG. 1A is a functional block diagram of an exemplary computer architecture for the inventive system.

Referring now to FIG. 1A, this figure is a functional block diagram of an exemplary computer architecture of an inventive system 101 for data mining of messages. The system 101 may comprise a computer server 100A that executes a summarizing data mining module/method 10 and a user interface module 177. The summarizing data mining module 10 may comprise hardware or software (or both). The summarizing data mining module 10 generally corresponds with the method 10 for data mining described below in connection with FIG. 1B.

The system 101 may further comprise a database 195, a computer communications network 105, a server 100C that supports a short data messaging system and short data messages like TWITTER™ brand data messages, and a plurality of client computers 100B1, 100B2. The client computers 100B1, 100B2 may comprise a portable computing device and/or a computing device as defined above.

Figure 1B:
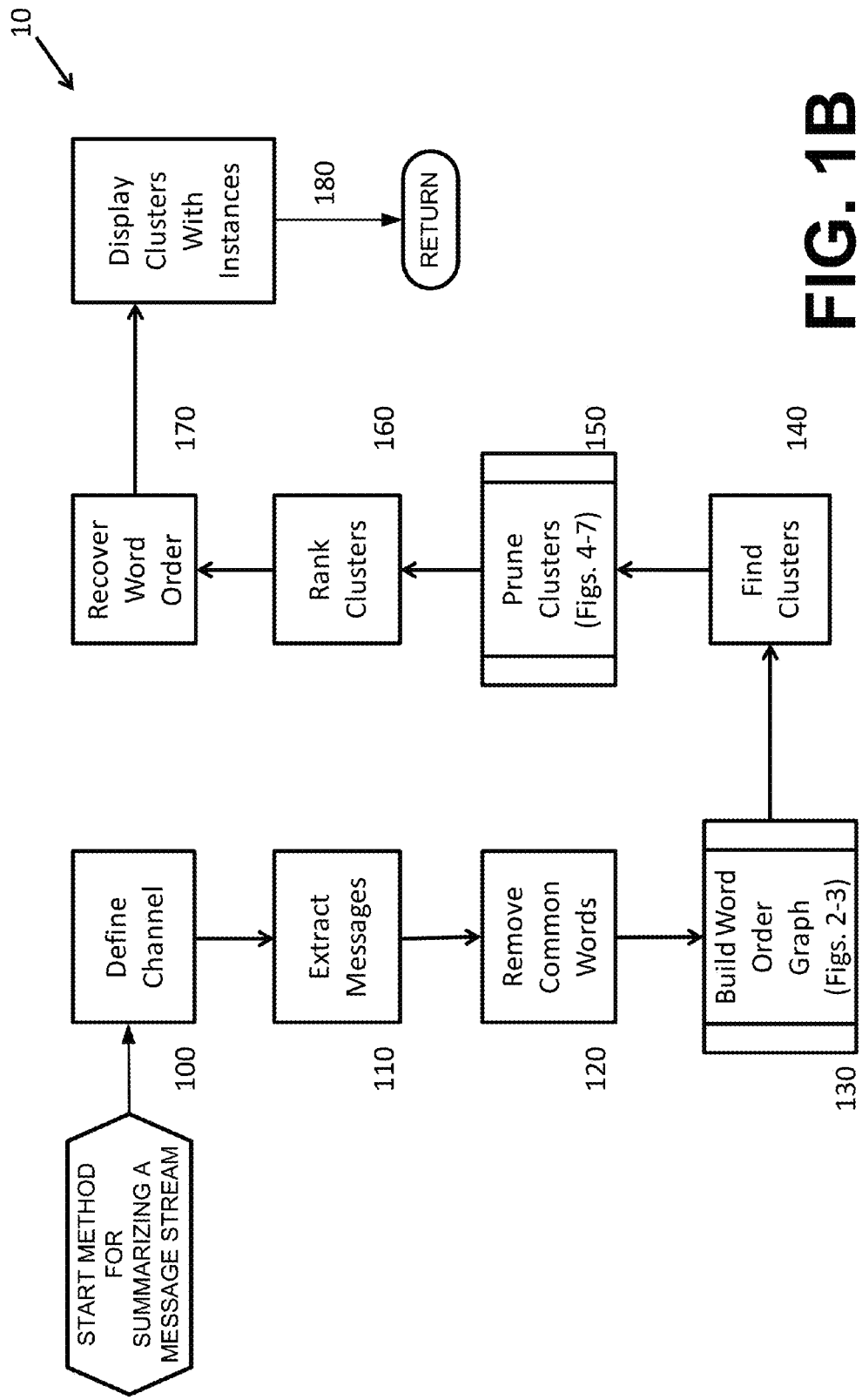
FIG. 1B is a flow chart showing the main steps in executing the exemplary method for summarizing data.

The links between elements illustrated in FIG. 1B may comprise wired or wireless couplings or links. Wireless links include, but are not limited to, radio-frequency ("RF") links, infrared links, acoustic links, and other wireless mediums.

The communications network 105 may comprise a wide area network ("WAN"), a local area network ("LAN"), the Internet, a Public Switched Telephony Network ("PSTN"), a paging network, or a combination thereof. The communications network 105 may be established by broadcast RF transceiver towers (not illustrated). However, one of ordinary skill in the art recognizes that other types of communication devices besides broadcast RF transceiver towers are included within the scope of this disclosure for establishing the communications network 105.

The server 100A running the summarizing data mining module 10 may be directly coupled to the database 195. The database 195 may comprise a sequential query language (SQL) database as understood by one of ordinary skill the art.

The server 100A running the summarizing data mining module 10 and user interface module 177 may support a plurality of user interfaces that are accessed by the client computers 100B using an Internet browser. Further details of these user interfaces generated by the user interface module 177 will be described below in connection with FIGS. 9-26.

FIG. 1B is a flow chart illustrating an exemplary method 10 for data mining of messages. Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium.

Computer-readable media may include both computer storage media and communication media as well as any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium or tangible computer-readable medium. For example, if the software is transmitted from a website, server, or other remote source, such as in "cloud" computing, using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Referring now to FIG. 1A, suppose that there is a stream of short data messages. One example is a stream of TWITTER™ brand short data messages, which currently number about two-hundred million per day as of this writing. Each message may include up to one-hundred forty characters, which converts to about thirty English language words. Other examples may include, but are not limited to, text messages transmitted over the telephone system, email messages, or short news stories, and/or press releases.

Block 100 is the first step of method 10 and it may include defining a communication channel. Defining a communication channel may comprise selecting a set of short data message broadcasters to follow, or specifying a set of key words that will be used to extract a sub-stream of short data messages. If the communication channel is defined by the words {like "Egypt", "hash-tag (#)JAN25", or "Taharir"}, then all messages that contain any of these words may be diverted into the sub-stream. Note that "#JAN25" is an example of a hash-tag which may be used in short data messages, as of this writing, to denote a particular subject of general interest. The hash-tag "#" character may introduce a hash-tag.

Hash-tags may be particularly useful for defining communication channels in short data message streams. In conventional short data message systems, like the TWITTER™ brand short data message system, a sub-stream may be defined geographically, such as by a GPS location and/or a radius. These short data message streams may be accessed over a communications link with server 100C of FIG. 1A.

Next, in block 110, an extraction process may be introduced using a channel definition. A channel definition may be used as a filter on a complete short data message stream to capture the short data messages that might be of interest. This channel definition may be introduced to a short data system, such as with server 100C of FIG. 1A, through an API ("Application Programming Interface") as understood by one of ordinary skill in the art.

Subsequently, in block 120, a text language-specific step may be introduced. This step may be implemented separately for each spoken language being analyzed, such as for the English language. If short data messages are written in Spanish, then this block 120 may be implemented for the Spanish language.

Short data messages generated and maintained at server 100C of FIG. 1A may contain many common words that are not necessary for understanding the meaning of the message. In the English language, such words may include articles {like "a", "an", "the"} as well as prepositions {"in", "on", "over", "under", etc. . . . }. Any word that is very common in a particular spoken language, and is not needed to get the general meaning of a message may be dropped from the computer-implemented analysis of method 10.

Some words in a language, while seemingly common, should be retained for analysis in method 10 depending on their impact for a particular short data message. For example, the word "not" in the English language should be retained and not dropped in this block 120 because this small word may reverse the whole meaning of an entire message.

This block 120 further includes additional language specific pre-processing. For example, punctuation that does not impact meaning should be removed, and all words should be put completely in lower case to avoid potential confusion between capitalized and un-capitalized versions of the same word. In the English language, the possessive (apostrophe "'s") should be removed so that words like "Joe" and "Joe's" may be treated as the same.

The system 101 and method 10 are not limited to the English language examples described here. The system 101 and method 10 may include other language specific processing not specifically described in this disclosure for the English language as well as other languages as understood by one of ordinary skill in the art.

Next, in routine block 130, a solution to potential word order problems is addressed. In this routine or submethod block 130, each short data message, such as a message comprising 140 characters or less, may be reduced to a subset of its original words, all in lower case. All of these short data messages are about to be put into a computational blender in the subsequent blocks, like block 140 through block 160.

The words of a each short data message received from the sever 100C may be rearranged for mathematical purposes in this routine block 130. When the clusters of words are finally presented to the user, the words will be in an arbitrary order and will make no sense. This is quite different from the typical case in market basket analysis, where items in a shopping cart {like an order or sequence such as milk and eggs} makes just as much sense as {eggs presented before milk}.

Figure 2:
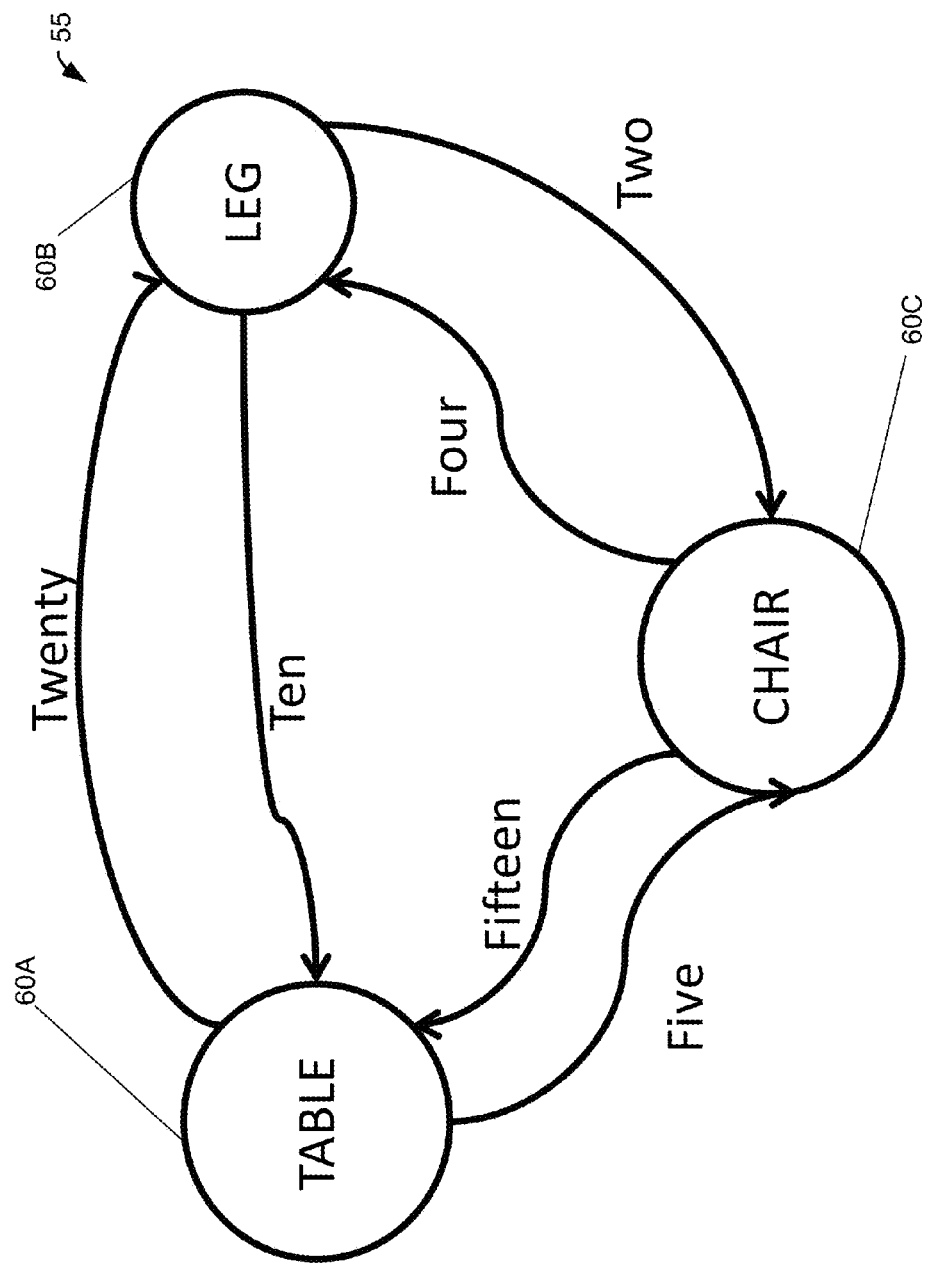
FIG. 2 is an illustration of a small part of the word order graph produced according to the word order graph routine mentioned in FIG. 1B.
Figure 3:
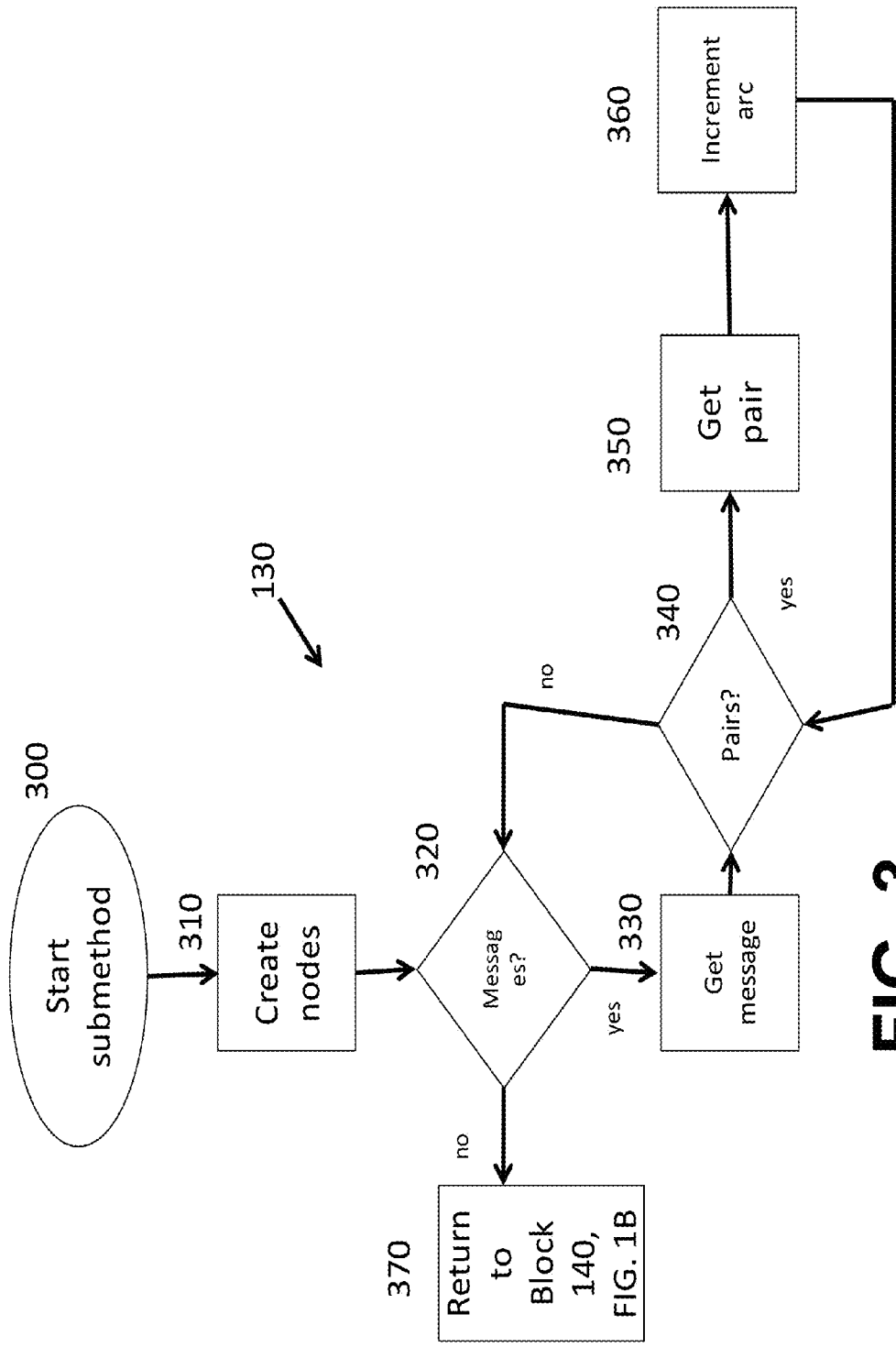
FIG. 3 shows the main steps in constructing the word order graph.

To present the clusters of words from a short data message in a meaningful order, a word order graph may be built, BEFORE, all the short data messages are thrown into the remaining "blender" processing of blocks 140 through 160. Further details of this routine block 130 are illustrated in FIGS. 2-3 that are described below.

Referring now to block 140 of FIG. 1B, clusters of words are discovered by software and/or hardware of the inventive method/summarizing data mining module 10 through association analysis from the a priori algorithm described above. For a given word, the number of times it appears in the set of messages is referred to as the frequency of the word. For a given threshold level, say ten for example, then all of the words with a frequency of at least ten may be designated as type "1-word clusters."

One important step in the algorithm executed in this block 140 is finding all pairs of words (2-word clusters) that have a pair-frequency of at least ten. A pair-frequency may be defined as the number of times that two words appear together in the same short data message. Then, the a priori algorithm may use the 2-word clusters and the 1-word clusters to find the 3-word clusters.

3-word clusters are word triples that appear together in the same short data message at whatever the threshold level that has been designated, such as ten times as one exemplary threshold. From this, the 3-word clusters and the 1-word clusters may also be used to find the 4-word clusters, and so forth.

In general, the n-word clusters and the 1-word clusters may be used to find the (n+1)-word clusters. An (n+1)-word cluster is a set of (n+1) words that appear together in at least a designated threshold number of messages.

The algorithm executed in this block 140 by the summarizing data mining module 10 proceeds until there are no clusters of words having some size. Generally, the number of word clusters of a given size increases with the size up to some maximum and then decreases down to zero.

For short data messages, like short data messages having about one-hundred forty characters, the maximum word cluster size is usually about fifteen. The average number of words in a short data message having this one-hundred forty character length is usually about ten, and the maximum is about thirty.

The inventive summarizing data mining module/method 10 includes an important extension to the a priori algorithm. When a stream of short data messages are being monitored, it is usually desirable to detect conversations that are just beginning.

For example, consider all of the short data messages that may be generated while a Movie Show Award Celebration, like the Academy Awards in Hollywood, Calif., television show is in progress. The short data messages generated in connection with this event at a server 100, like server 100C of FIG. 1A, may be summarized when the television show is over, but it is much more interesting to summarize the short data messages generated in real time and to detect new topics as they emerge from the streams of short messages.

To accomplish the generation of a real-time or near real-time summary of a plurality of short data messages, the time stamp of each short data message may be used. Each short data message with a timestamp, therefore has an age, so the "age" of a word cluster may be defined as being the time when those words first appeared together in a message.

The a priori algorithm used by the summarizing data mining module 10 may eliminate word clusters that do not reach some threshold frequency. The threshold may be a constant that is applied to all word clusters. According to one exemplary embodiment, a time dependent threshold may be employed. The time dependent threshold may increase as the age of the word cluster increases. Thus, a new word cluster may survive with a smaller frequency than an older word cluster according to this time dependent threshold.

This means that emerging topics may not be thrown out and/or discarded from the summary data. If emerging topics grow, meaning that they have a longer age or life, then usually they will be kept for the summary data. If the topics don't grow, then they may be eliminated from the summary data as they age.

After block 140, in routine or submethod block 150, word clusters may be pruned. Details of routine block 150 are described below in connection with FIGS. 4-7. The pruning operation of this routine block 150 may include where most of the word clusters found are thrown out/removed from the summary data. The a priori algorithm may produce a set of word clusters up to some maximum size, for example 1, 2, 3, . . . , and sometimes even 15 word length clusters.

One fundamental fact is that if a first word cluster A is a subset of a second word cluster B, then the frequency of A is usually greater than and/or equal to the frequency of B. If one more word is added to the word cluster, then the frequency of the word cluster cannot increase.

In market basket analysis, word clusters of all sizes are of interest. In the analysis of short data messages, such as those having one-hundred characters or less, however, a longer word cluster is usually much more interesting than a shorter word cluster.

A word cluster of seven or eight words may capture the meaning of a message much better than a cluster of three or four words. Also, if the frequency of a 5-word cluster is almost the same as that of one of its 4-word sub-clusters, then the 4-word cluster may be characterized as clutter. The 4-word cluster may be pruned and not shown to the user, because it does not add any incremental information.

After routine block 150, in block 160, word clusters that survived pruning in block 150 may be ranked. At block 160, in some scenarios one hundred to two hundred surviving word clusters could be shown to the user. But in what order should these surviving word clusters be presented?

The most important word clusters usually should be shown first. A word cluster usually has two important attributes: the number of words in the word cluster and its frequency. (Remember, a word cluster's frequency is usually the number of messages that are instances of the cluster.) Size and frequency of the word clusters may be combined by some mathematical function to produce a ranking, and then the word clusters may be shown in order of their rank.

An exemplary ranking function may comprise the following formula:

Rank (as a function of size, frequency)=log(frequency)*size

Recall that each word cluster also has an age. A separate ranking may be provided by age, or combine size, frequency, and age into a single rank. For example, another formula which accounts for age may include the following:

Rank(as a function of size, frequency, age)=log(frequency)*size/age

The aforementioned ranking functions are only two examples. Other ranking functions not specifically described in this disclosure may be employed without departing from the scope of this disclosure as understood by one of ordinary skill in the art.

After the word clusters are ranked in block 160, then in block 170, the summarizing data mining module 10 may run an operation of putting the words in each word cluster into an intelligible order. Specifically, each surviving word cluster may include a set of words, but the words may be positioned in an arbitrary order as determined by the various iterations of the algorithms used in this inventive method 10.

Before showing the word clusters to an operator, a natural word order for the word clusters may be recovered by using the word order graphs that were prepared in routine block 130 described above.

Consider any n-length word cluster. There are usually n*(n-1)/2 pairs of words. For example, in a 7-word length word cluster there are usually (7*6)/2=21 pairs of words.

For each pair of words, such as table and leg (from the example illustrated in FIG. 2), a word order graph such as illustrated in FIG. 2 may be referenced. In the exemplary embodiment of FIG. 2., the word "table" came before the word "leg" twenty times, while the word "leg" came before the word "table" ten times as indicated by the word order graph 55. In this exemplary scenario, the word "table" may be characterized as the "winner" for this word pair/word cluster.

The "winner" for each pair of words may be easily determined in this manner by looking at the values in the word order graph 55. Then, after the winners are determined, the words of the word cluster may be arranged according to the number of times that they were the "winner" as determined from each word graph 55. This can be done for each of the surviving word clusters. This recover word order block 170 is not perfect in practice, but it performed very well in tests with short data messages having 140 characters or less so far.

After the word order for the surviving word clusters is determined in block 170, in block 180, the final set of word clusters may be presented to the operator on a display device. Each word cluster may be displayed in its natural word order. In one preferred application of the inventive method 10 and system 101, each word cluster is usually accompanied by one representative instance.

All of the instances of a particular word cluster may be accessible by clicking on the word cluster, as if they were behind the display of the surviving word clusters. Thus, the final word clusters may be presented to the user as a summary of a stream of short data messages, and all of the individual short data messages that are represented by the word cluster may be readily available for any detailed review by an operator of the inventive system and method 10.

Figure 1C:
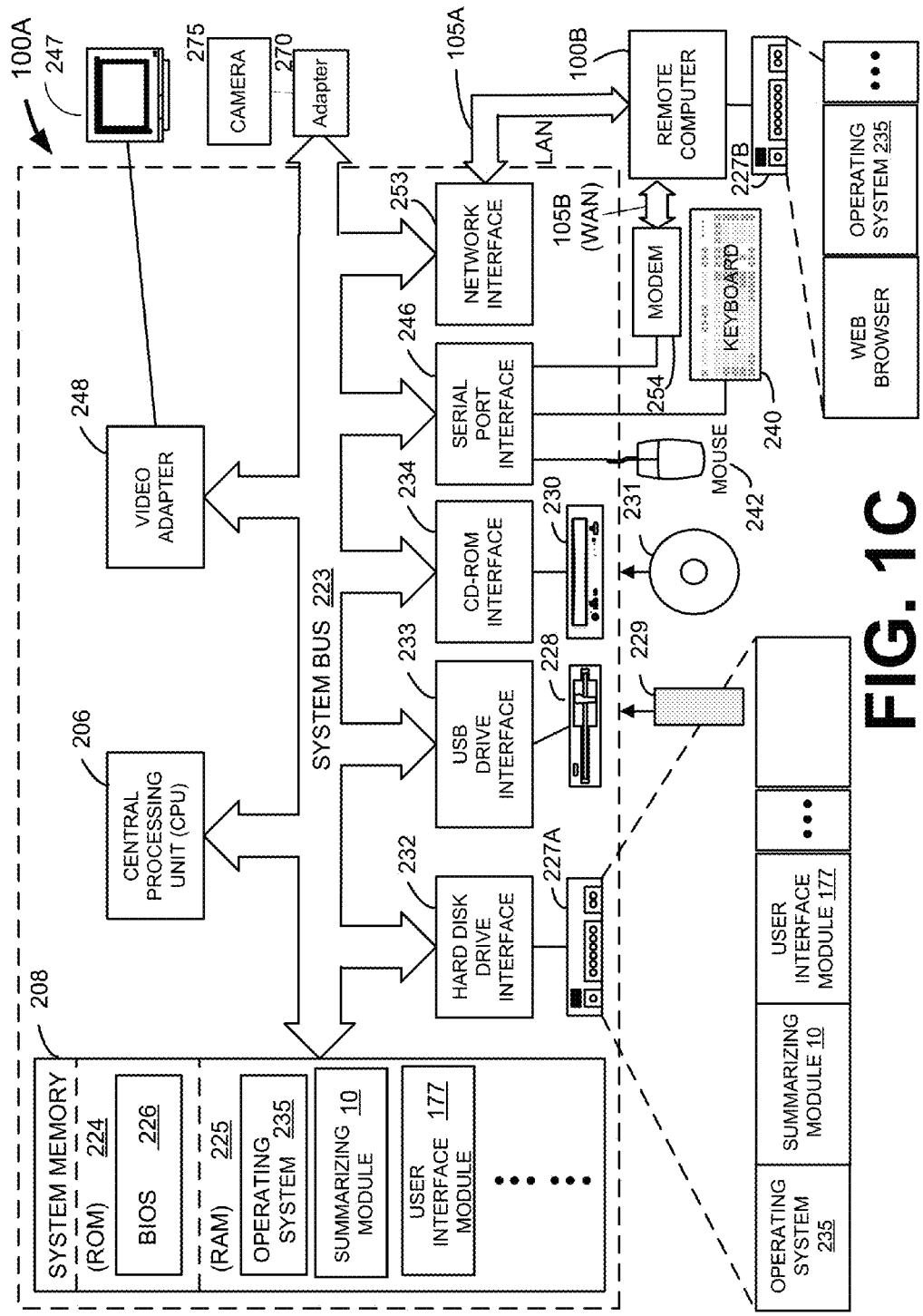
FIG. 1C is a functional block diagram of a general purpose computer for performing the steps illustrated in FIG. 1A.

Referring now to FIG. 1C, this figure is a functional block diagram of the host computer server 100A of FIG. 1A that can be used in the system 101 and method 10 for summarizing and data mining according to an exemplary embodiment of the invention. The exemplary operating environment for the system includes a general-purpose computing device in the form of a conventional computer 100.

Generally, the computer 100A includes a processing unit 106, a system memory or storage 208, and a system bus 223 that couples various system components including the system memory 208 to the processing unit 206.

The system bus 223 may be any of several types of bus structures including a memory bus or memory controller, a peripheral bus, and a local bus using any of a variety of bus architectures. The system memory includes a read-only memory (ROM) 224 and a random access memory (RAM) 225. A basic input/output system (BIOS) 226, containing the basic routines that help to transfer information between elements within computer 100A, such as during start-up, is stored in ROM 224.

The computer 100A can include a hard disk drive 227A for reading from and writing to a hard disk, not shown, a universal serial bus (USB) drive 228 for reading from or writing to a removable USB flash memory unit 229, and an optical disk drive 230 for reading from or writing to a removable optical disk 231 such as a CD-ROM or other optical media. Hard disk drive 227A, USB drive 228, and optical disk drive 230 are connected to system bus 223 by a hard disk drive interface 232, a USB drive interface 233, and an optical disk drive interface 234, respectively.

Although the exemplary environment described herein employs hard disk 227A, USB drive 229, and removable optical disk 231, it should be appreciated by those skilled in the art that other types of computer readable media which can store data that is accessible by a computer, such as magnetic cassettes, digital video disks (DVDs), Bernoulli cartridges, RAMs, ROMs, and the like, may also be used in the exemplary operating environment without departing from the scope of the invention. Such uses of other forms of computer readable media besides the hardware illustrated will be used in computer networked (i.e.—Internet) connected devices.

The drives and their associated computer readable media illustrated in FIG. 1C provide nonvolatile storage of computer-executable instructions, data structures, program modules, and other data for computer 100A. A number of program modules may be stored on hard disk 227, USB drive 229, optical disk 231, ROM 224, or RAM 225, including, but not limited to, an operating system 235 and the summarizing module(s) 10 and user interface module 177 of FIG. 1B.

Program modules include routines, sub-routines, programs, objects, components, data structures, etc., which perform particular tasks or implement particular abstract data types. A user may enter commands and information into computer 100A through input devices, such as a keyboard 240 and a pointing device 242.

Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 206 through a serial port interface 246 that is coupled to the system bus 223, but may be connected by other interfaces, such as a parallel port, game port, a universal serial bus (USB), Wi-Fi or the like.

The display 247 may also be connected to system bus 223 via an interface, such as a video adapter 248. As noted above, the display 247 can comprise any type of display devices such as a liquid crystal display (LCD), a plasma display, an organic light-emitting diode (OLED) display, and a cathode ray tube (CRT) display.

A camera 275 may also be connected to system bus 223 via an interface, such as an adapter 270. The camera 275 can comprise a video camera such as a webcam. The camera 275 can be a CCD (charge-coupled device) camera or a CMOS (complementary metal-oxide-semiconductor) camera. In addition to the monitor 247 and camera 275, the computer 100A may include other peripheral output devices (not shown), such as speakers and printers.

The computer 100A may operate in a networked environment using logical connections to one or more remote computers 100B. These remote computers 100 may comprise an Internet browser as illustrated in FIG. 1A that is used to access the summarizing module 10. In such an exemplary scenario, the computer 100A may comprise one or more server computers coupled together across a computer network.

Each remote computer 100B may be another personal computer, a computer server, a mobile phone, a router, a network PC, a peer device, tablet (e.g., iPad) or other common network node. While the remote computer 100B typically includes many or all of the elements described above relative to the main computer 100A, only a memory storage device 227B has been illustrated in this FIG. 20 for brevity. The logical connections depicted in FIG. 1C include a local area network (LAN) 105A and a wide area network (WAN) 105B. Such networking environments are commonplace in offices, enterprise-wide computer networks, intranets, and the Internet.

When used in a LAN networking environment, the computer 100A is often connected to the local area network 105A through a network interface or adapter 253. When used in a WAN networking environment, the computer 100A typically includes a modem 254 or other means for establishing communications over WAN 105B, such as the Internet. Modem 254, which may be internal or external, is connected to system bus 223 via serial port interface 246. In a networked environment, program modules depicted relative to the main computer 100A, or portions thereof, may be stored in the remote memory storage device 227B of the remote computer 100B. It will be appreciated that the network connections shown are exemplary and other means of establishing a communications link between the computers 100 may be used.

Moreover, one of ordinary skill in the art will appreciate that the present invention may be implemented in other computer system configurations, including hand-held devices, multiprocessor systems, microprocessor based or programmable consumer electronics, network personal computers, minicomputers, tablets (e.g., iPad) mainframe computers, and the like. The invention may also be practiced in distributed computing environments, where tasks are performed by remote processing devices that are linked through a communications network. In a distributed computing environment, program modules may be located in both local and remote memory storage devices.

Referring now to FIG. 2, a small portion of a word order graph 55 produced according to the word order graph construction routine 130 of FIG. 1B is illustrated in FIG. 2. The word order graph 55 may have a node 60 for each word, for example node 60A for the word "table", a node 60C for the word "chair", and a node 60B for the word "leg".

For each pair of nodes 60, there may be at most two arcs (arrows). In FIG. 2, there is an arrow pointing from the node 60A for "table" to the node 60B for "leg." This arrow is labeled with the word "twenty." This means that in all of the short data messages being analyzed by the computer implemented method 10, the word "table" comes before the word "leg" twenty times.

There is also an arrow pointing from the node 60B for the word "leg" to the node 60A for the word "table", labeled with the word "ten." This means that in all of the short data messages being analyzed by the computer implemented method 10, the word "leg" comes before the word "table" at least ten times.

This is one aspect of the inventive method 10 and system 101 in routine block 130: to build such a word order graph for all of the words that appear in all of the short data messages. Note that some pairs of words, such as the words {ice, cream} usually appear in the same order for the English language. Meanwhile, other pairs of words in the English language may never appear in the same message (at least in a current set of short data messages). For example, in the English language, it is hard to imagine the words "banana" and "balloon" to ever be in the same short data message.

In a typical application of the inventive method 10 and system 101, volumes on the order of at least 50,000 words and 500,000 messages may be analyzed. The resulting word order graph for such a volume of short data messages may be quite large but is typically very sparse. This means that most pairs of words from this volume are usually not connected. This word order graph may be used later, in block 170 described above, to recover the proper word order for each cluster.

Referring now to FIG. 3, this figure shows in detail how the word order graph of block 130 of FIG. 1B is constructed, starting at block 300. In block 310, a node 60 is created for each word that appears in the set of short data messages. All of the short data messages received by the summarizing data mining module 10 are then processed in this manner. In block 320, the summarizing data mining module 10 determines if there are any more short data messages to be processed.

If not, then the "NO" branch is followed to block 370 and the subprocess returns to block 140 of FIG. 1B. If there are more messages, the summarizing data mining module 10 selects one in block 330, and it forms all pairs of the words that appear in the short data message being analyzed. For example, if the message is "happy mother's day", the summarizing data mining module 10 may form the following word pairs: {happy, mother}, {happy, day}, and {mother, day}.

Each of these pairs is processed one at a time by the summarizing data mining module 10. In block 340, the summarizing data mining module 10 asks if there are any more pairs of words from the short data message to be processed. If there are no more pairs for the current short data message, then the "NO" branch is followed to block 320 to see if there are any more messages. If more pairs of words do exist at block 340, then the "YES" branch is followed to block 350. In block 350, the summarizing data mining module selects one of the pairs.

Next, in block 360, which may be an important step, is where the summarizing data mining module 10 increments the arc counts as illustrated in the word graph 55 of FIG. 2. For example, if the word pair is {happy, day}, then the directed arc from "happy" to "day" has its count incremented by one. (If this arc had a count of zero, then the arc is actually created for the first time.)

Any pair of words that have not yet been seen in a short data message has an implicit count of zero, and no such arc actually exists. At the end of this submethod or routine 130, there is a directed arc (arrow) between the pairs of words such as a word A and a word B with a count of x, such the words "table" and "leg" having the count of twenty as illustrated in the word graph 55 illustrated in FIG. 2.

Figure 4:
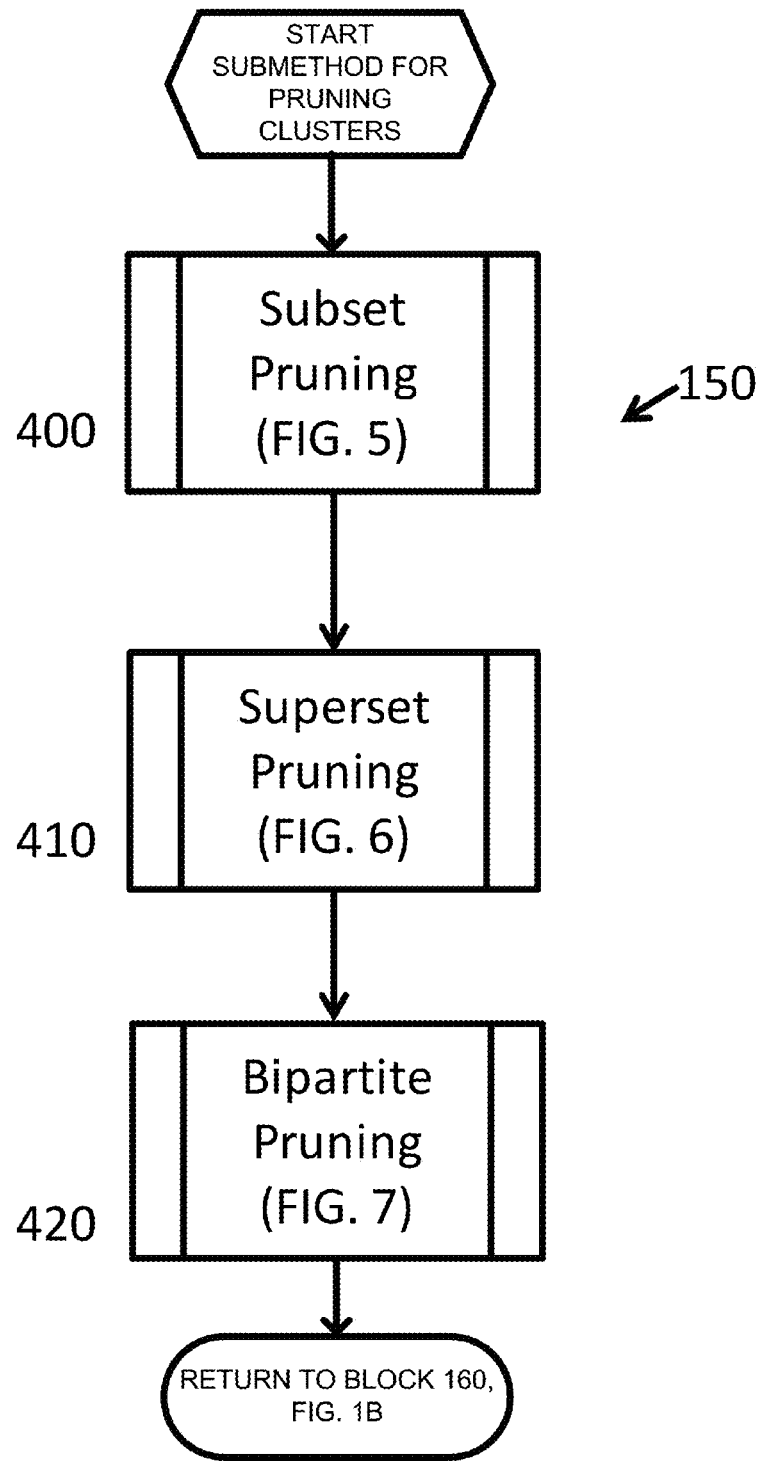
FIG. 4 is an expansion of block 150 in FIG. 1A, showing the several kinds of cluster pruning that are part of the inventive system and method.

FIG. 4 illustrates additional subroutines of the pruning word cluster subroutine block 150 of FIG. 1B. FIG. 4 illustrates several different kinds/types/levels of pruning that may be employed by the summarizing data mining module 10. The pruning subroutine block 150 may comprise a subset pruning subroutine 400, a superset pruning subroutine block 410, and a bipartite pruning subroutine block 420. Further details of the subset pruning subroutine will be described below in connection with FIG. 5, while further details for the superset pruning routine 410 and the bipartite pruning subroutine 420 will also be described below but in connection with FIGS. 6-7, respectively.

One purpose for pruning is to decide which word clusters to show to the operator, and which ones to not display or highlight. For example, for every 7-word cluster with a frequency of at least 10 there are 7 6-word clusters that have a frequency of at least 10. If the difference in frequency is not too great, the operator should be shown the 7-word cluster while all 6-word clusters are hidden or presented in a less pronounced manner relative to the 7-word cluster.

On the other hand, if the 7-word cluster has a frequency of 10, but one of the 6-word clusters has a frequency of 100, then perhaps the 7-word cluster should be hidden while the 6-word cluster is shown. Pruning is a matter of balancing an increasing number of words against a decreasing frequency: pruning assists the summarizing data mining module 10 to determine which clusters will convey the most information?

Block 400 of FIG. 4 comprises subset pruning. In subset pruning, for each cluster size n (n at least 3), the summarizing data mining module 10 may compare each n-word cluster with each (n+1)-word cluster. If the smaller cluster is a subset of the larger cluster, and the frequency of the larger cluster is close enough (e.g. 90%) to the frequency of the shorter cluster, then the summarizing data mining module 10 may prune the shorter cluster.

One challenge here is that there may be thousands of n-word clusters and thousands of (n+1)-word clusters, which means millions of comparisons. One important aspect of the inventive system 101 and method 10 is that only a small fraction of these comparisons have to be performed. For example, if X is an n-word cluster with frequency f(X), and the tolerance is set to be about 90%, then X only has to be compared with supersets Y that have $0.9*f(X)<=f(Y)<=f(X)$.

If all of the (n+1)-word clusters are sorted by increasing frequency, then it is easy to determine a relatively small set of (n+1)-word clusters that have to be compared to n-word cluster X. The number of comparisons required may also be limited by using a lattice data structure that connects each cluster to all of its subsets and supersets.

But another important part of inventive system 101 and method 10 is to replace exact subset with "fuzzy" subset. X is a fuzzy subset of Y if "almost" all of the items in X are also in Y. The meaning of "almost" usually has to be specified/defined mathematically. Using fuzzy subsets may become very important with analyzing sets of words, but makes a lattice data structure inadequate, and makes the sorting of clusters by frequency even more important.

Figure 5:
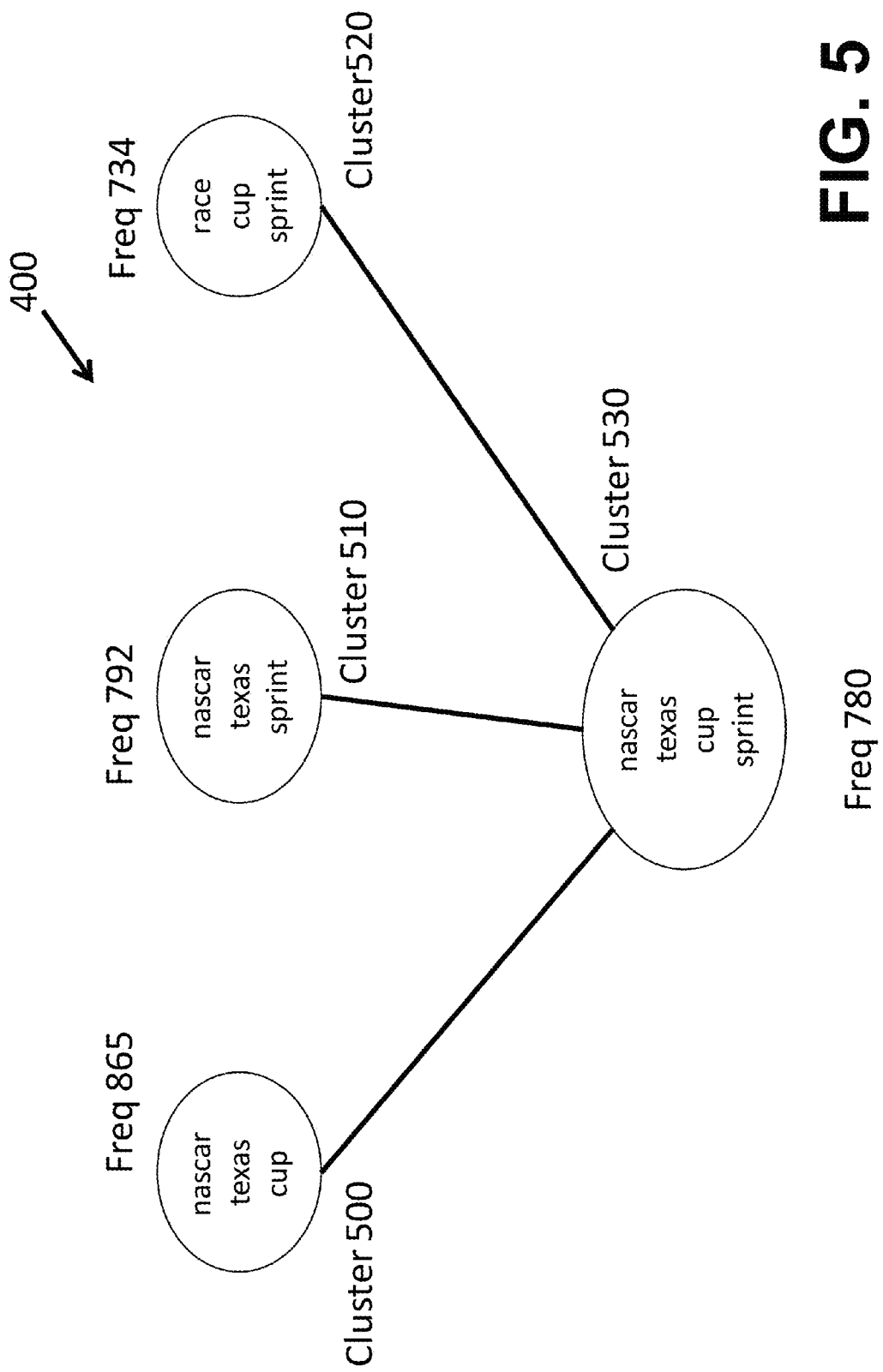
FIGS. 5, 6, and 7 are illustrations of the three kinds of pruning illustrated in FIG. 4.

FIG. 5 is an example of subset pruning which corresponds to the subset pruning block 400 of FIG. 4. Word clusters 500, 510, and 520 contain 3-word clusters with frequencies of 865, 792, and 734 respectively. All three of these 3-word clusters 500-520 may be eliminated by the 4-word cluster in cluster 530. The word clusters 500 and 510 are subsets of cluster 530, and the frequency of 780 is within 90% of both 865 and 792. Word cluster 520 illustrates a fuzzy subset relationship, since two of its three words are in word cluster 530.

Referring briefly back to FIG. 4, subroutine block 410 in FIG. 4 comprises superset pruning because all of the word clusters that survive subset pruning in routine block 400 are subjected to superset pruning in subroutine block 410. This subroutine block 400 again involves comparing n-word clusters to (n+1)-word clusters, but in this case it is the longer (n+1)-word clusters that are pruned.

According to this subroutine block 410, if X is a fuzzy subset of Z, and f(Z) is too much less than f(X), then eliminate Z. For example, f(Z)<0.9*f(X). One idea here is that the strong cluster X has been fragmented into weak clusters like Z. Doing this efficiently again involves sorting the (n+1) clusters on increasing frequency.

Figure 6:
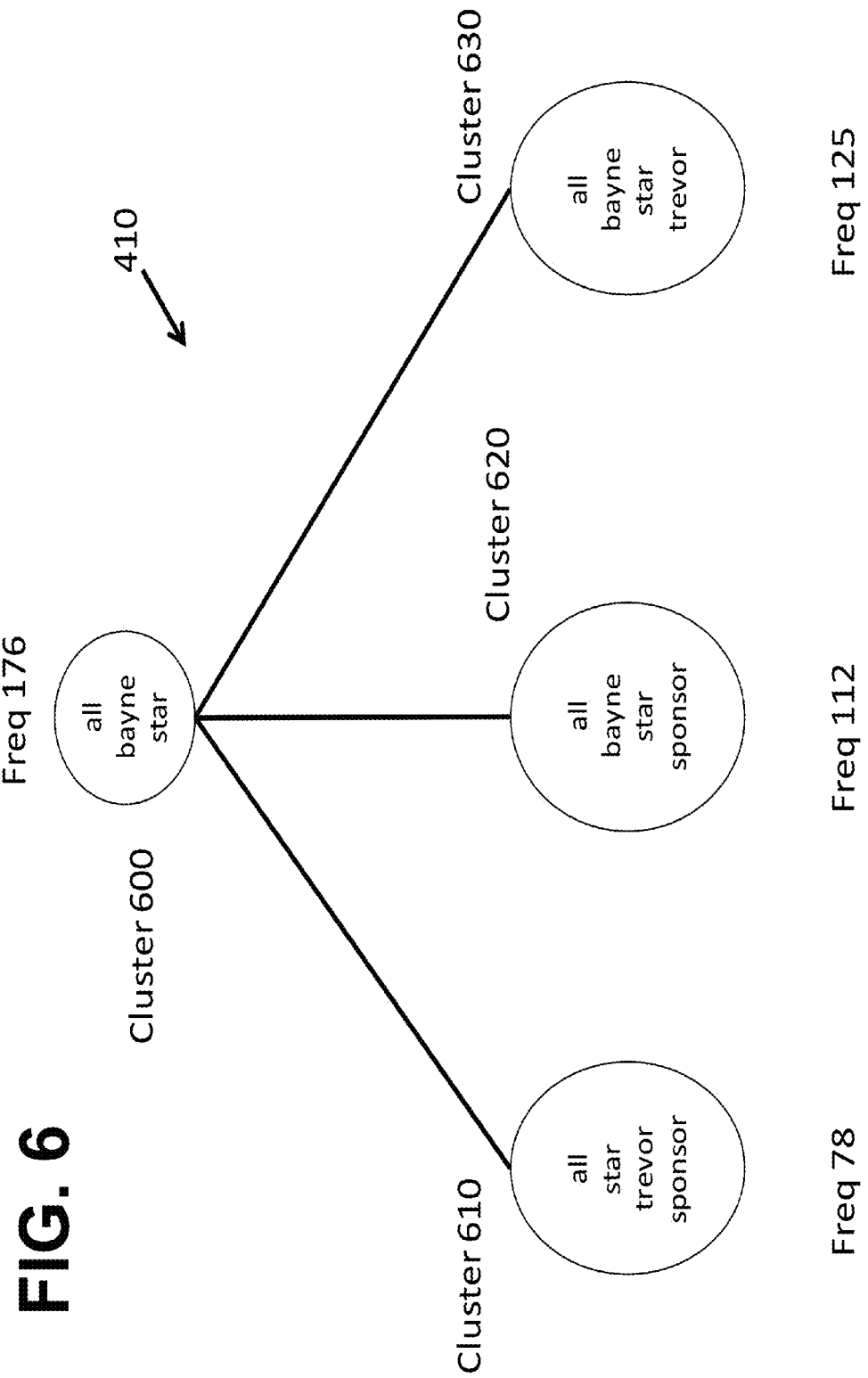

FIG. 6 is an illustration of superset pruning that corresponds with the superset pruning subroutine 410 of FIG. 4. Word clusters 610, 620, and 630 contain 4-word clusters with frequencies of 78, 112, and 125 respectively. All three of these 4-word clusters may be eliminated by the 3-word cluster 600. The frequencies of 78, 112, and 125 are all less than 90% of 176 (which is 158.4). Word cluster 600 is a "perfect" subset of word clusters 620 and 630, and a fuzzy subset of word cluster 610.

Referring back to routine block 420 of FIG. 4, this routine block 420 comprises bipartite pruning. To explain this level of pruning: visualize a bipartite graph that has two kinds of nodes. On the left side are source nodes while on the right side are sink nodes.

The only arcs in this graph go from a source node to a sink node. In this application the source nodes represent word clusters, of whatever size, and sink nodes may represent the original messages. Now, envision several hundred source nodes and perhaps 500,000 sink nodes. In such a graph, an arc from a source node (word cluster) to a sink node (message) means that the message is an instance of the cluster. For a message to be an instance of a cluster, it usually must contain every word of that word cluster.

In subset and superset pruning of routine blocks 400 and 410, two clusters, where one is a fuzzy subset of the other, were searched. Then arguments were made based on their relative frequencies. Bipartite pruning is a little different from this approach.

According to bipartite pruning, word cluster X and word cluster Y may not be close enough for either to be a fuzzy subset of the other, but they may have "almost" the same set of instances. Of course "almost" must be made with some precision mathematically.

According to one exemplary embodiment of the system 101, "almost" under the bipartite pruning subroutine 420 of FIG. 4 may be handled in the following way. Suppose two word clusters, X and Y, were being considered and have n(X) and n(Y) instances respectively. Let n(X,Y) denote the number of short data messages that are instances of both clusters.

Then assume, without loss of generality, that X has fewer instances, n(X)<=n(Y). Word cluster X may be eliminated if the number of instances is almost the same, such as defined by the function n(X)>=0.9*n(Y), and most of the short data messages involved are instances of both clusters, n(X,Y)>=0.9*n(X). This 0.9 may be an adjustable parameter that helps define "almost."

The purpose of a word cluster is generally to act as a summary of its set of instances. If word cluster X and Y have almost the same set of instances, then there is no need to show them both to the operator of system 101. Once the bipartite graph has been constructed, it can be used to compare every pair of clusters and determine if their sets of instances are almost the same.

Figure 7:
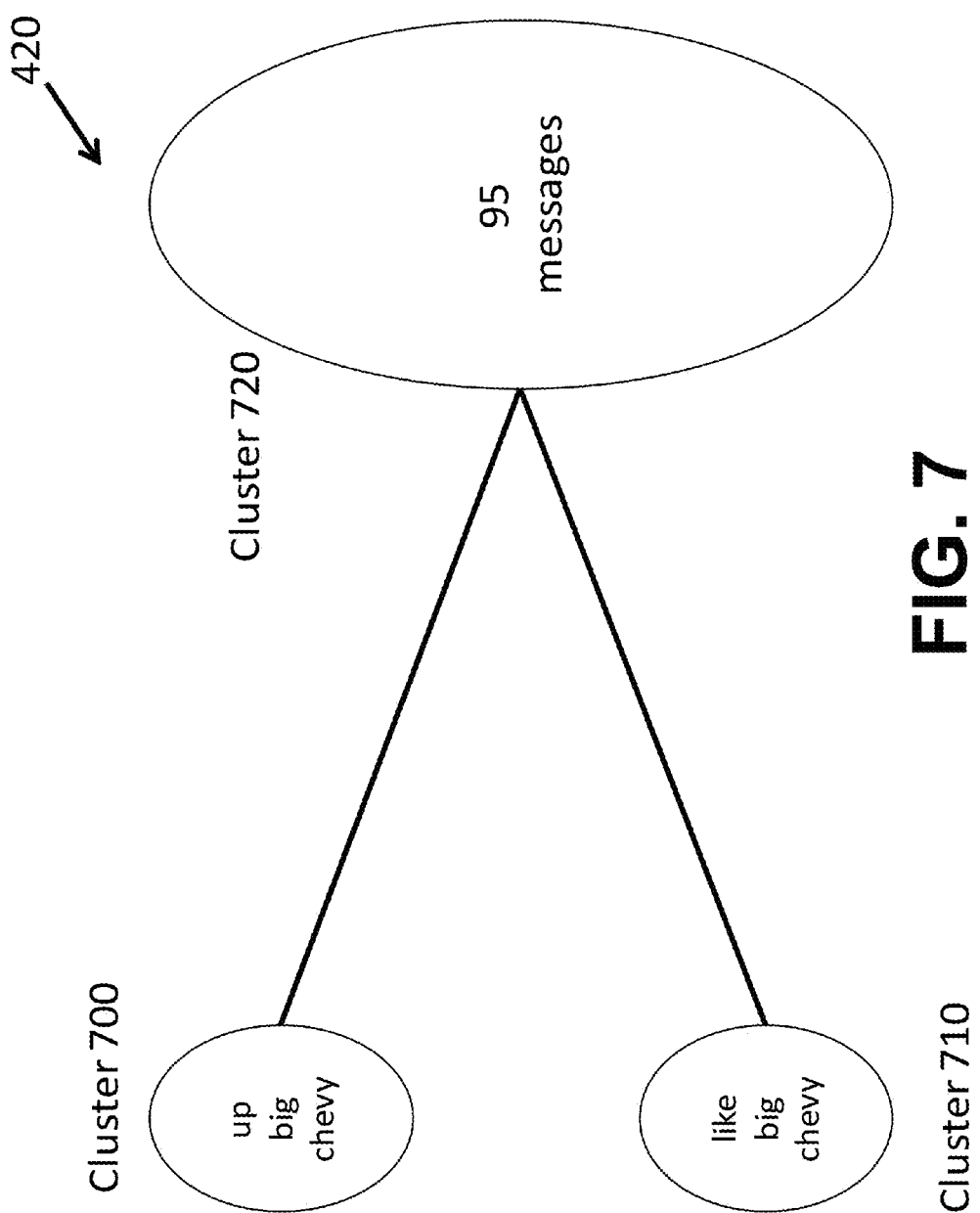

FIG. 7 is an example of bipartite pruning corresponds to subroutine Block 420 of FIG. 4. Word clusters 700 and 710 represent two of the 3-word clusters that have survived subset and superset pruning of routine blocks 400 and 410. Each of these 3-word clusters may have ninety-five instances, that is, ninety-five short data messages may contain all three words. The two sets of ninety-five messages are exactly the same, and so either one of the 3-word clusters (block 700 or block 710) may be eliminated or hidden and not shown to the operator of the system 101. FIG. 7 reflects the merger of clusters 700 and 710 into a single cluster 720 that is presented to the operator of the system 101.

While FIG. 7 illustrates a visual merger, one of ordinary skill in the art recognizes that the data sets for both word clusters 700 and 710 may be maintained in memory as desired and for record keeping purposes should the operator desire to review any detailed calculations made by the summarizing data mining module 10. The bipartite pruning of FIG. 7 does not usually depend on common words in the two word clusters 700 and 710, but on common messages in the two sets of instances.

Additional Applications of Data Mining Module 10 Beyond Summarizing

Two additional applications of the system 101 beyond summarizing short data messages include the following: (a) topic identification and (b) people ranking.

According to an alternate exemplary embodiment, word clusters may be grouped into topics, as a higher order summary. See, for example, the top ten topics menu 1110 of FIG. 11, described in more detail below. A graph with a node may be constructed by the data mining module 10 for word each cluster and an arc with weight w connecting two clusters if they have w words in common. Such a graph may have islands, that is, connected sets of word clusters that are disjointed relative to one another.

Each island may then be treated as a "topic." A topic may have one or more word clusters, and a word cluster can belong to, usually at most, one topic. The operator of the system 101 may be presented with topics at the highest level, word clusters at an intermediate level, and the raw short data messages at the lowest level.

According to another exemplary embodiment, the system 101 may present an operator with summary information about the people who have sent the messages (short data messages). See, for example, summarized message content 1405 of FIG. 15 described below.

Each short data message may have an identification number that records the person who sent the short data message. So a person's name who originates each short data message may be tracked, and the short data messages which belong to each cluster may be identified. This means all of the people who have contributed to a given cluster may be tracked and identified by an operator of the system 101.

A graph may be constructed with a node for each person and an arc with weight c connecting two people if they have both contributed to the same c clusters. Such a graph may be characterized as a people graph. If two people are connected in a people graph, then this means that they are talking about the same things (topics).

Each person may be assigned a score based on the number of word clusters that they contribute to and the number of other people they are connected to in the people graph. A ranking of the one-hundred people with the highest scores may be presented to the operator of the system 101. This may define a global ranking with respect to the complete set of raw short data messages stored in memory and being tracked.

For example, see the score 2105 in left column of FIG. 21, as will be described in further detail below. A local ranking may also be provided with respect to each specific word cluster, which may be shown the most important people to that word cluster. This may also be done at the topic level.

Figure 8:
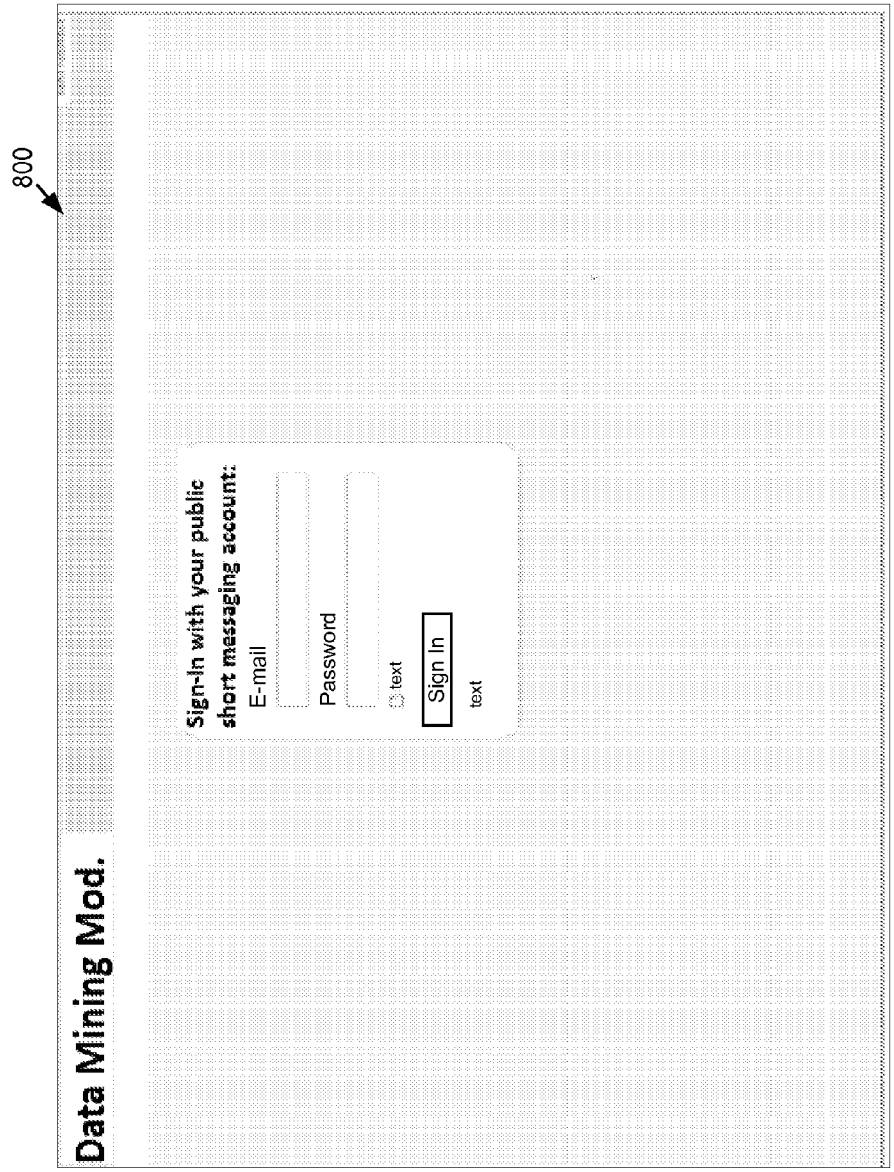
FIG. 8 is an illustration of an exemplary graphical user interface for logging into an account maintained by the summarizing module.

Referring now to FIG. 8, this figure is an illustration of an exemplary graphical user interface 800 for logging into an account maintained by the summarizing data mining module 10. The account maintained by the summarizing module 10 may be branded and the user interface may display this branding of the account. The words, "DATA MINING MOD." may be substituted for a brand of the summarizing data mining module 10.

According to the exemplary embodiment illustrated in FIG. 8, the login credentials for accessing the account maintained by the summarizing module 10 may comprise an e-mail address and a password. However, other types of login credentials, such as, but not limited to, secure user-identifiers assigned by the 100A, may be used as understood by one of ordinary skill in the art.

Figure 9:
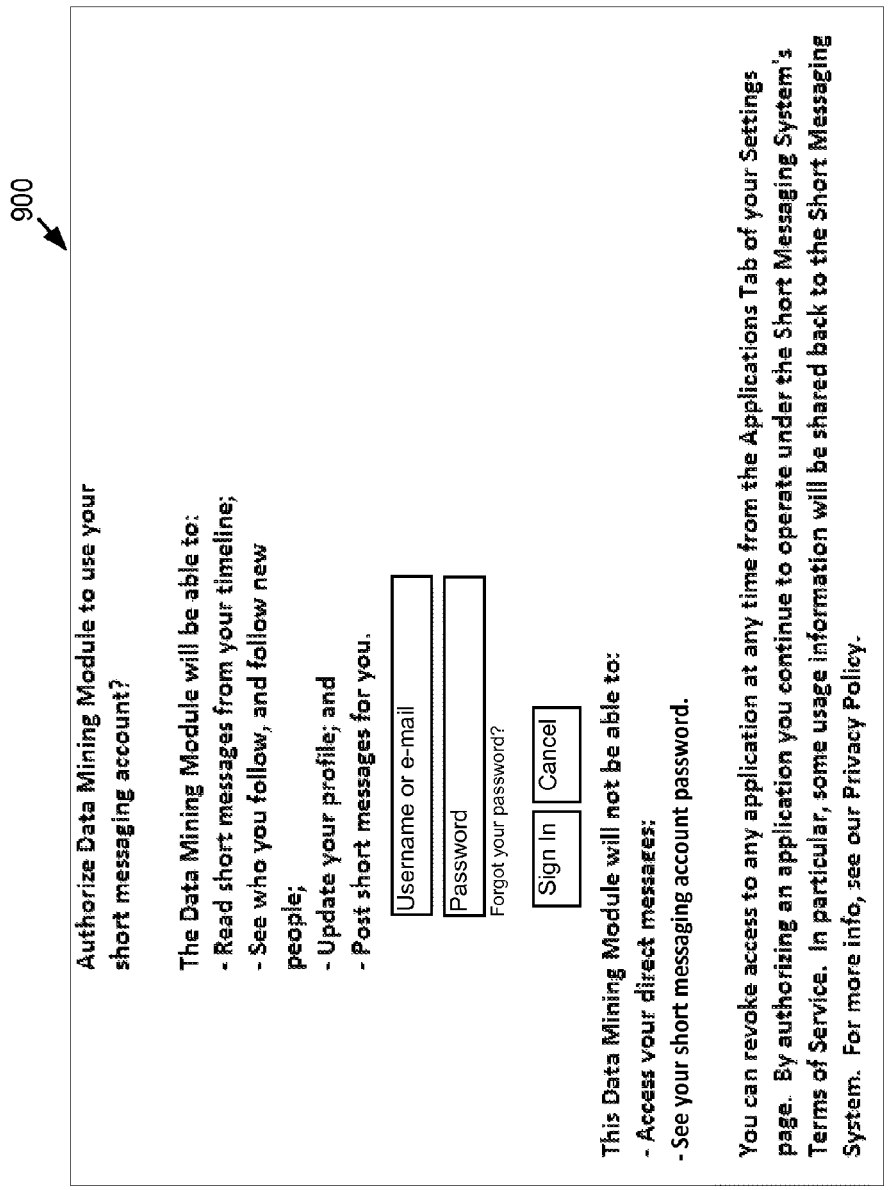
FIG. 9 is an illustration of an exemplary graphical user interface for linking a summarizing module account with a short data messaging account.

FIG. 9 is an illustration of an exemplary graphical user interface 900 for linking a summarizing module account with a short data messaging account. In this exemplary embodiment, the graphical user interface 900 provides fields for the user to enter the credentials for a short data messaging account, like a TWITTER™ brand short messaging account.

After the credentials are completed for the short data messaging account which may be supported by a third party short data message server 100C as illustrated in FIG. 1A, this allows the summarizing data mining module 10 running on server 100A of FIG. 1 to access the short data messaging account in order to gather data. Specifically, this user interface 900 creates a link between the summarizing module 10 (maintained by first server 100A of FIG. 1A) and the short data messaging account, such as a TWITTER™ account, that may be supported by the server 100C illustrated in FIG. 1A.

Figure 10:
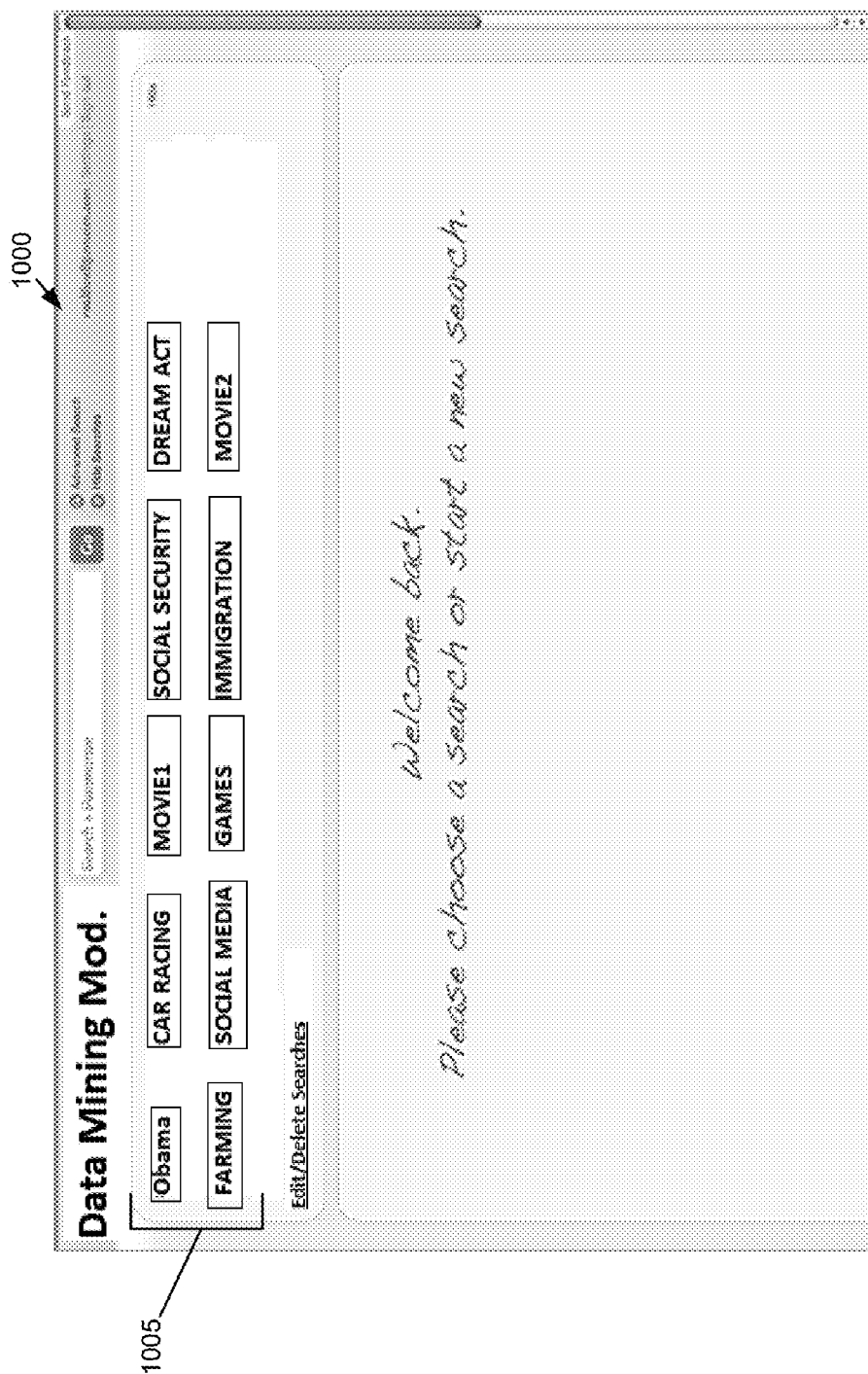
FIG. 10 is an illustration of an exemplary graphical user interface that comprises a menu of options for conducting various different searches with the summarizing module account.

FIG. 10 is an illustration of an exemplary graphical user interface 1000 that comprises a menu 1005 of options for conducting various different searches with the summarizing module account. In the exemplary embodiment illustrated in FIG. 10, a history of past searches identified by keywords is listed in this opening graphical user interface 1000. The history in this exemplary embodiment includes the following keywords: Obama, Car Racing, Movie1, Social Security, Dream Act, Farming, Social Media, Games, Immigration, Movie2.

These keywords indicate that the operator of the summarizing data mining module 10 had executed searches involving these keywords in a prior session. These prior searches may be displayed again to the operator if they are selected by the operator with a screen pointer/user interface.

At the very top of this user interface 1000, the user may enter new keywords for searching across conversations occurring in real-time in the short data messaging system, such as the TWITTER™ brand short messaging system supported by the second computer server 100C illustrated in FIG. 1B.

Figure 11:
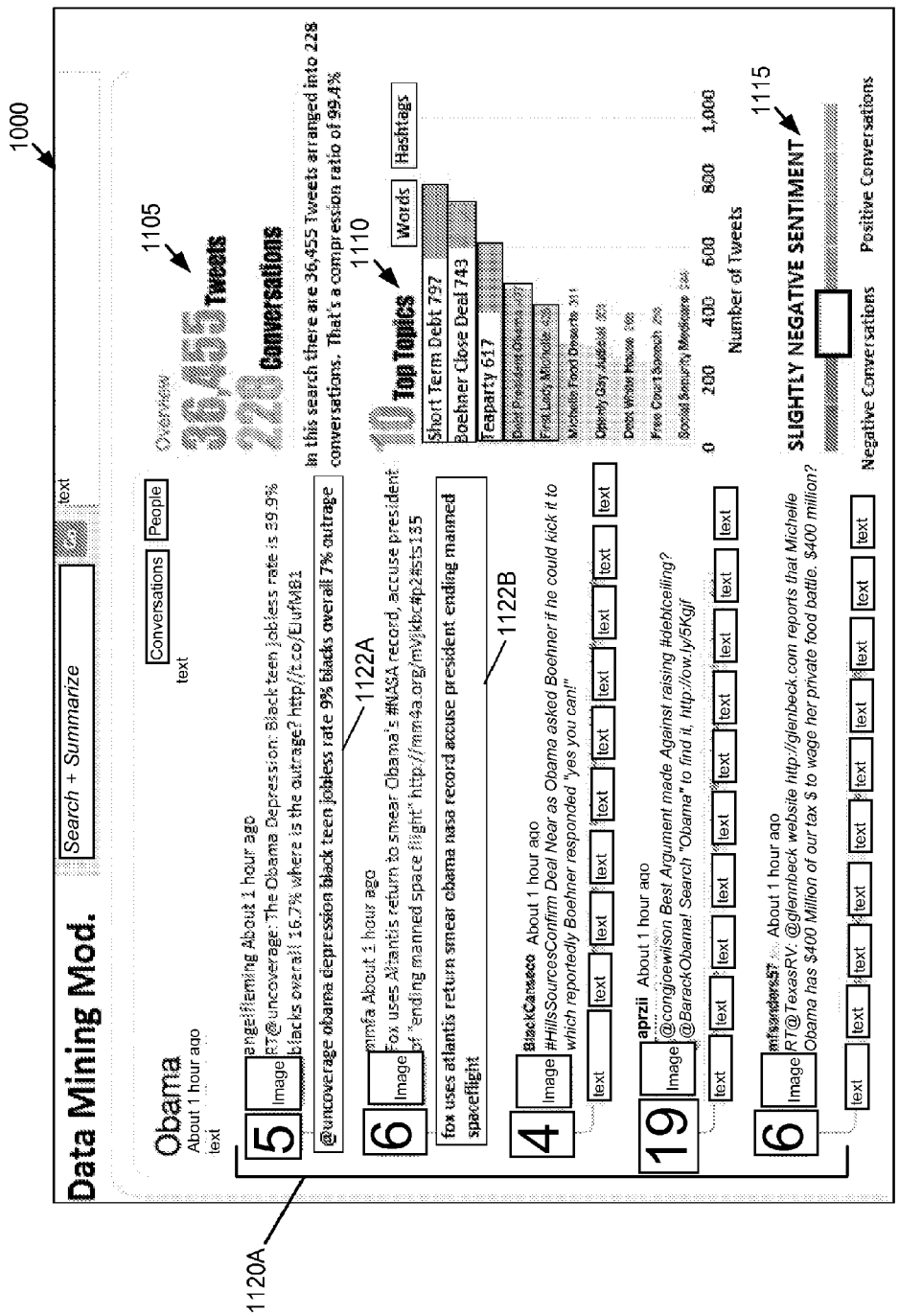
FIG. 11 illustrates an exemplary graphical user interface that comprises a display of summarized message content after an option for conducting a search has been selected.

FIG. 11 illustrates an exemplary graphical user interface 1100 that comprises a display of summarized message content after an option for conducting a search has been selected. The graphical user interface 1100 was generated in response to the user selecting the keyword of "Obama" which was one of the keywords listed from a prior search as illustrated in the user interface 1000 of FIG. 10.

The summarized message content for the keyword of "Obama" shows the short data messages which are the most relevant to the keyword as determined by the summarizing data mining module 10. The overview section 1105 of the graphical user interface 1100 located in the top right section of the user interface 1100 displays the number of short messages reviewed (i.e. the "TWEETS"/messages reviewed in this example) and the number of conversations which formed these messages. The overview section 1105 generally corresponds to the "signal" being monitored by the summarizing data mining module 10 from the entire unorganized message content (data messages) that may be analogized as "noise."

Underneath the overview section 1105, the summarizing data mining module 10 has also produced the top ten topics 1110 that are based on the current short data messages being posted to the message server 100C of FIG. 1B. The top ten topics menu 1105 displays the most popular topics, which are clusters of word clusters.

The graphical user interface 1100 further comprises a sentiment menu 1115 that is positioned underneath the top ten topics menu 1105. Further details about the sentiment menu 1115 will be described below. In this exemplary embodiment, summarized message content 1120 may comprise short data messages (i.e.—"tweets") grouped based on patterns of matching words 1122 being detected by the summarizing data mining module 10 described above.

In the exemplary embodiment illustrated in FIG. 11, a first set of words 1122 has been extracted from a first data message and displayed in a rectangular box. The first set of words 1122A extracted from the first data message included the terms, "uncoverage," "obama," "depression," "black," "teen," "jobless," "rate," "9%," "blacks," "overall," "7%," and "outrage."

These words 1122A have been highlighted with a singular rectangular box. As noted above, the graphical user interface 1100 of FIG. 11 was generated in response to the user selecting the keyword of "Obama" which was one of the keywords listed from a prior search as illustrated in the user interface 1000 of FIG. 10.

A second set of words 1122B extracted from a second short data message has also been highlighted with a second rectangular box for emphasis. It is noted that in the remaining portion of FIG. 11 and other figures of this disclosure, words 1122 extracted from short data messages may be contained within a singular rectangular box or alternatively, with smaller individual boxes which may circumscribe individual words that are extracted by the summarizing data mining module 10. Any type of graphical element may be used to highlight the extracted words 1122. Further, in some exemplary embodiments, it may be an option to not display the extracted words 1122 at all depending on the type of display that is desired by the operator as understood by one of ordinary skill in the art.

Figure 12:
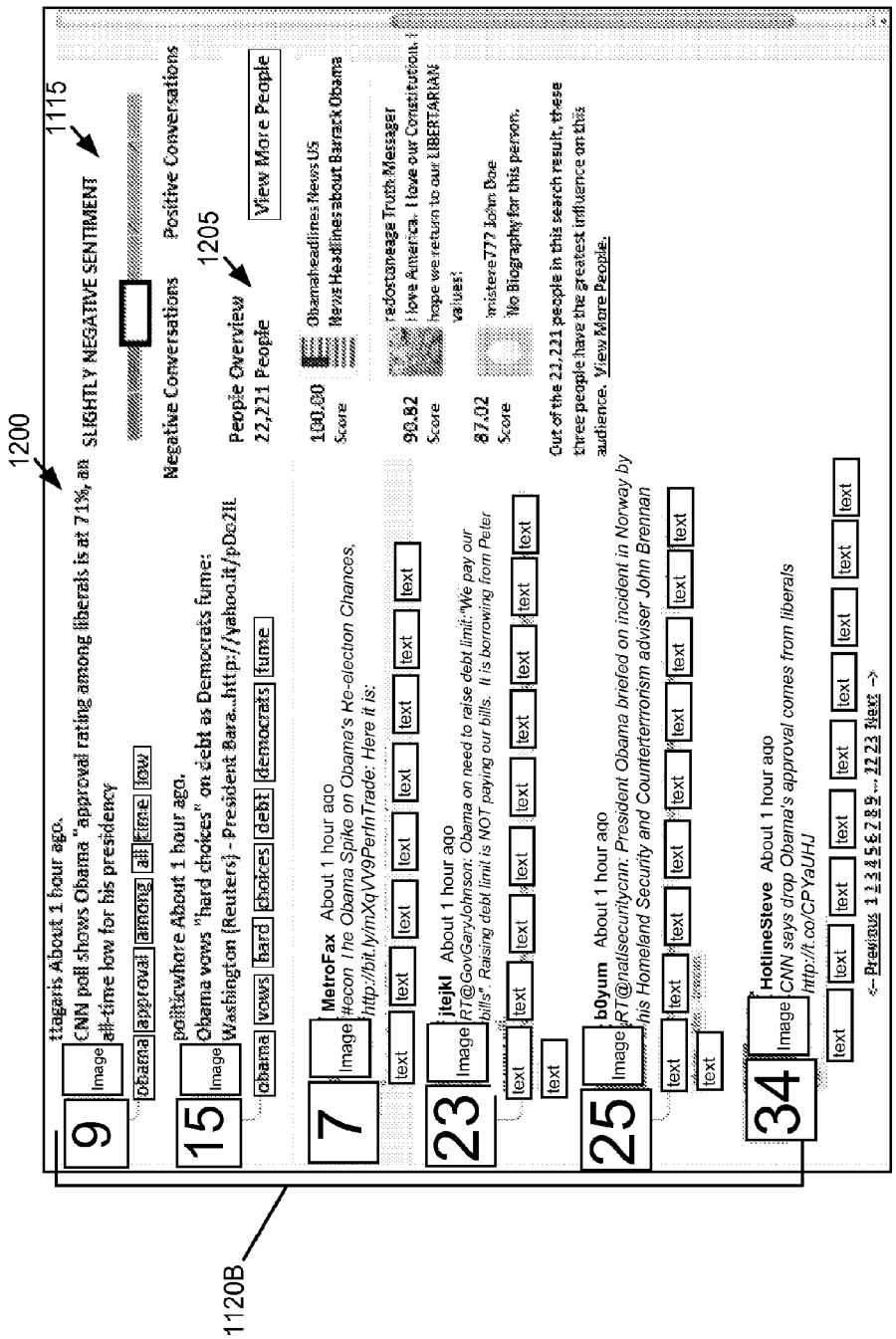
FIG. 12 illustrates an exemplary graphical user interface that includes a people ranking menu as described above.

FIG. 12 illustrates an exemplary graphical user interface 1200 that includes a people ranking 1205 as described above. Also displayed is the sentiment menu 1115 on the top right of the user interface 1200. The sentiment menu 1115 tracks the positive and negative attributes of conversations occurring on the short messaging server 100C of FIG. 1B.

The summarizing data mining module 10 classifies conversations by the "slider" position on the sliding scale which forms the conversation sentiment menu 1115. The summarizing data mining module 10 displays summarized message content 1120B that corresponds to the slider position on the sliding scale of the conversation sentiment menu 1115.

In the exemplary embodiment illustrated in FIG. 12, the summarized message content 1120B being displayed corresponds with the "slightly" negative message content position of the slider on the slider scale of the message sentiment menu 1115. As illustrated in FIG. 12, the slider position is at the third unit from the left-hand side of the scale. The left-hand side of the scale generally corresponds to the highest messages rank on negativity. Meanwhile the far right-hand side of the scale generally corresponds to the highest messages rank on positivity.

Sentiment scores may be computed based on a table of words ranked from very negative (−5 such as for an exemplary category, like "death") to very positive (+5 such as for an exemplary category, like "love"). One of ordinary skill in the art will appreciate that other scales and rankings are possible and are within the scope of this disclosure. Such scales and/or rankings may correspond with the language of the message content and may be personalized/customized as understood by one of ordinary skill in the art.

Short data messages according to one exemplary embodiment may be scored on sentiment based on a well-known word scoring method that assigns numbers from −5 to +5 according to negative or positive sentiment. For example, negative (−5) for the word "death" and positive (+5) for love, as described above.

The graphical user interface 1200 of FIG. 12 further includes a people ranking or the top influential people 1205 based on conversations and patterns being tracked by the summarizing data mining module 10. The people ranking 1205 forms a "people overview" section of the graphical user interface 1200. The summarizing data mining module 10 may provide each of these people with a numerical value or score that is based on the conversations originating from these people and what generally corresponds to the current position of the slider on the sentiment menu 1505.

Figure 13:
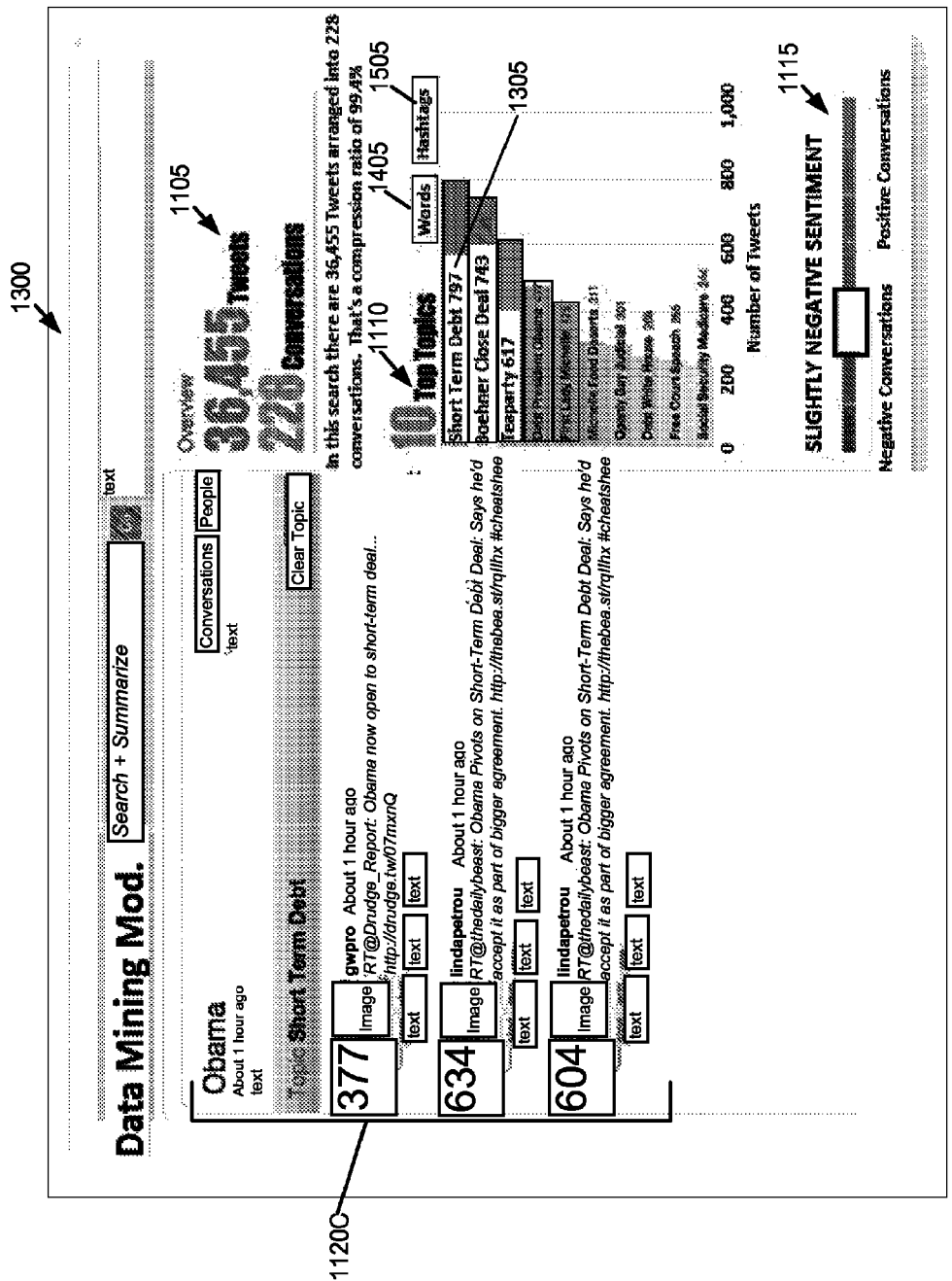
FIG. 13 is an illustration of an exemplary graphical user interface after a top ten topics menu has been selected.

FIG. 13 is an illustration of an exemplary graphical user interface 1300 after one topic 1305 from the top ten topics menu 1110 has been selected. The summarized message content 1120C of the graphical user interface 1300 is displaying those conversations involving the topic 1305 of 'Short Term Debt'. This message content 1120C corresponds to the number one ranking for the top ten topics menu 1110 which is currently 'Short Term Debt.'

Figure 14:
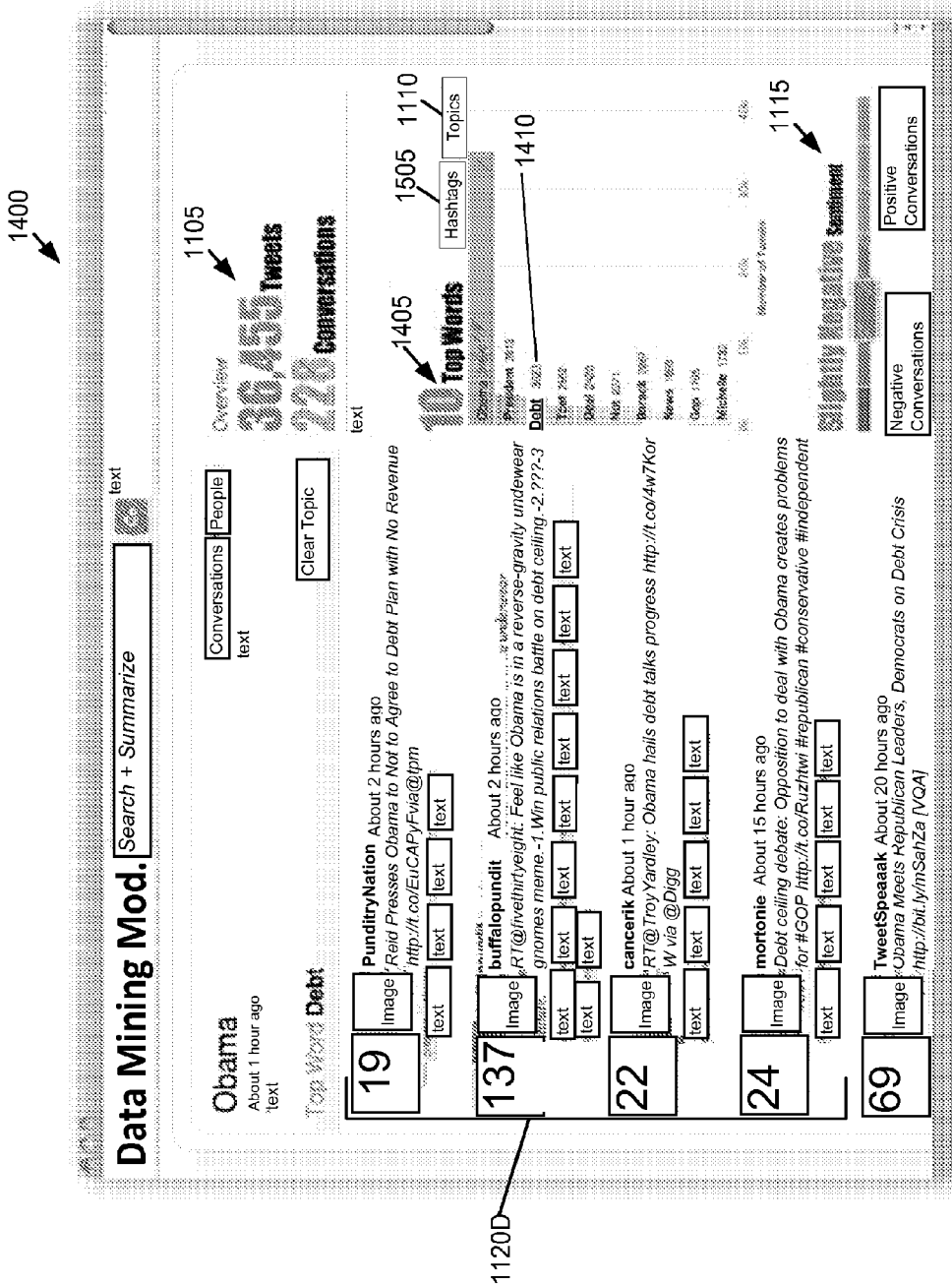
FIG. 14 is an illustration of the exemplary graphical user interface after a word from a top ten words menu has been selected by the user.

FIG. 14 is an illustration of the exemplary graphical user interface 1400 after a word 1410 from a top ten words menu 1405 has been selected by the user. The top ten words are usually the most common words in the short data messages. In this exemplary embodiment, the third ranked top ten menu word 1405 of "Debt" was selected by the user.

The summarized message content 1120D therefore comprises those conversations involving the word 'Debt' which is the selected word 1410 from the menu 1410. It is further noted that the summarized message content 1120D of FIG. 14 may also track or correspond to the selection that was made for the sentiment menu 1115 which is displayed beneath the top ten words menu 1405. If the sentiment menu 1115 is also changed/adjusted, then the summarized message content 1120D may also change as appropriate.

Figure 15:
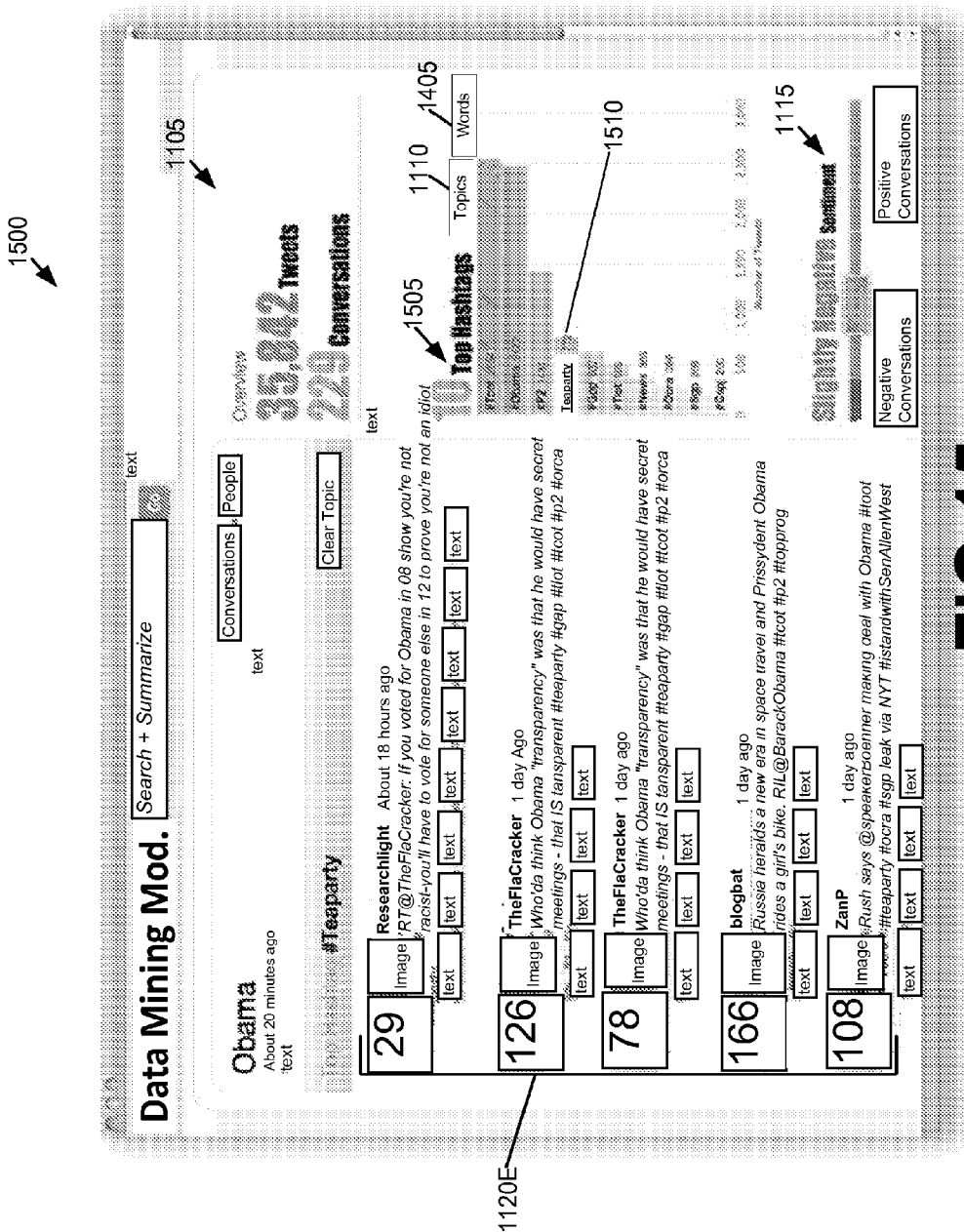
FIG. 15 is an illustration of the exemplary graphical user interface after a topic involving a hash-tag has been selected by the user.

FIG. 15 is an illustration of the exemplary graphical user interface 1500 after a topic involving a hash-tag has been selected by the user. The summarizing data mining module 10 may produce a top ten hash-tag menu 1505 that is similar to the top ten topic menu 1110 and top ten word menu 1405. However, the hash-tag menu 1505 focuses on keywords that include a hash-tag.

As noted above, the "#" character or hash-tag as used in the TWITTER™ brand short messaging system introduces a hash-tag topic. Hash-tags are particularly useful for defining channels in TWITTER™ brand short data message streams.

The summarized message content 1120E of the user interface 1500 of FIG. 15 comprises those conversations involving the hash-tag keyword of "Teaparty." This corresponds with the fourth-ranked hash-tag keyword 1510 that was selected by a user from the top ten hash-tag menu 1505 of FIG. 15.

It is further noted that the summarized message content 1120E of FIG. 15 may also track or correspond to the selection that was made for the sentiment menu 1115 which is displayed beneath the top ten words menu 1405. If the sentiment menu 1115 is also changed/adjusted, then the summarized message content 1120E may also change as appropriate.

Figure 16:
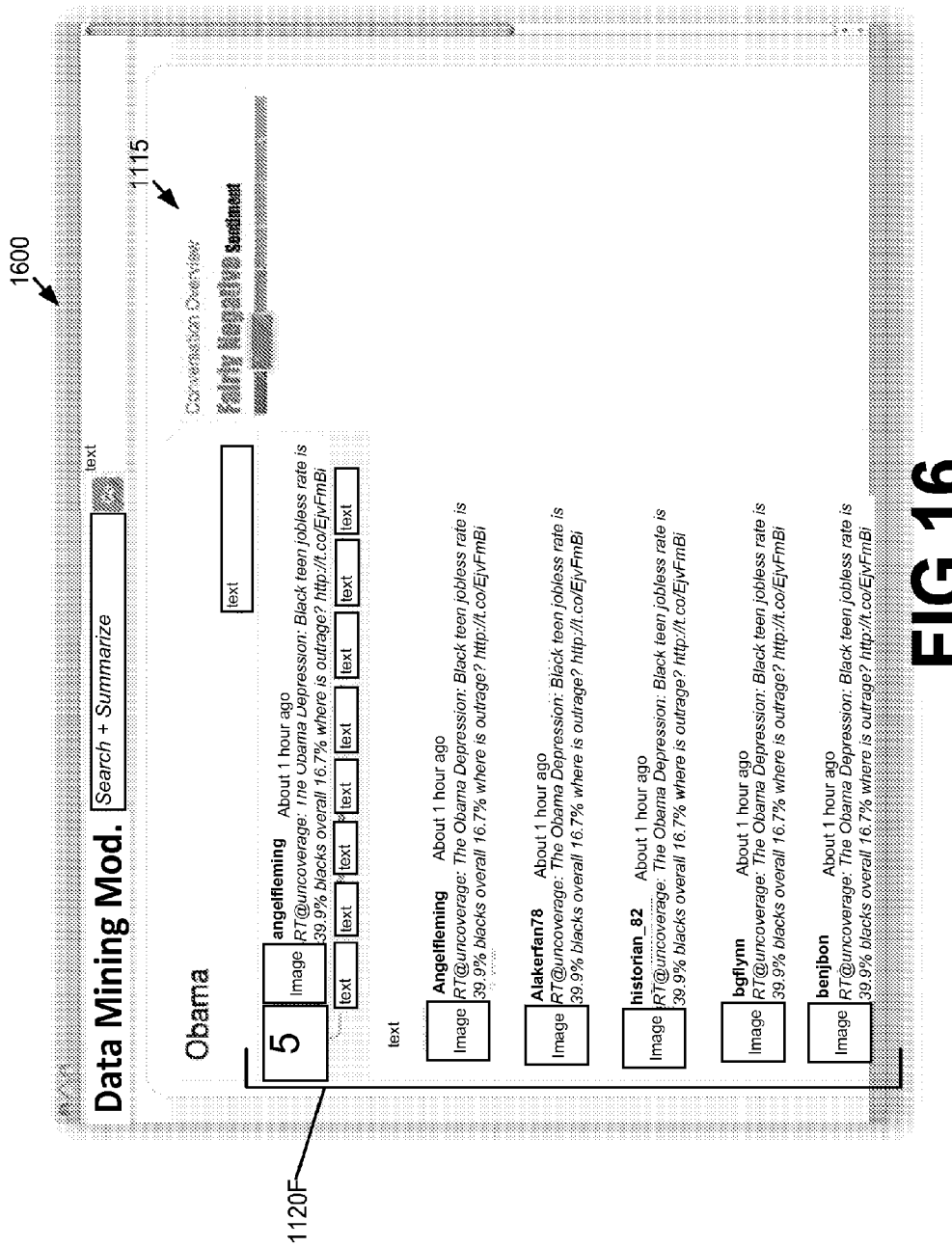
FIG. 16 illustrates an exemplary graphical user interface that comprises additional detail about conversations from a short data message account after they have been summarized and sorted according to the sentiment menu.

FIG. 16 illustrates an exemplary graphical user interface 1900 that comprises additional detail about conversations from a short data message account after they have been summarized and sorted according to the sentiment menu 1115. Specifically, this graphical user interface 1600 has been generated in response to the position of the slider in the sentiment menu 1115. The summarized message content 1120F lists the top conversations selected according to the position of the slider in the sentiment menu 1115.

Figure 17:
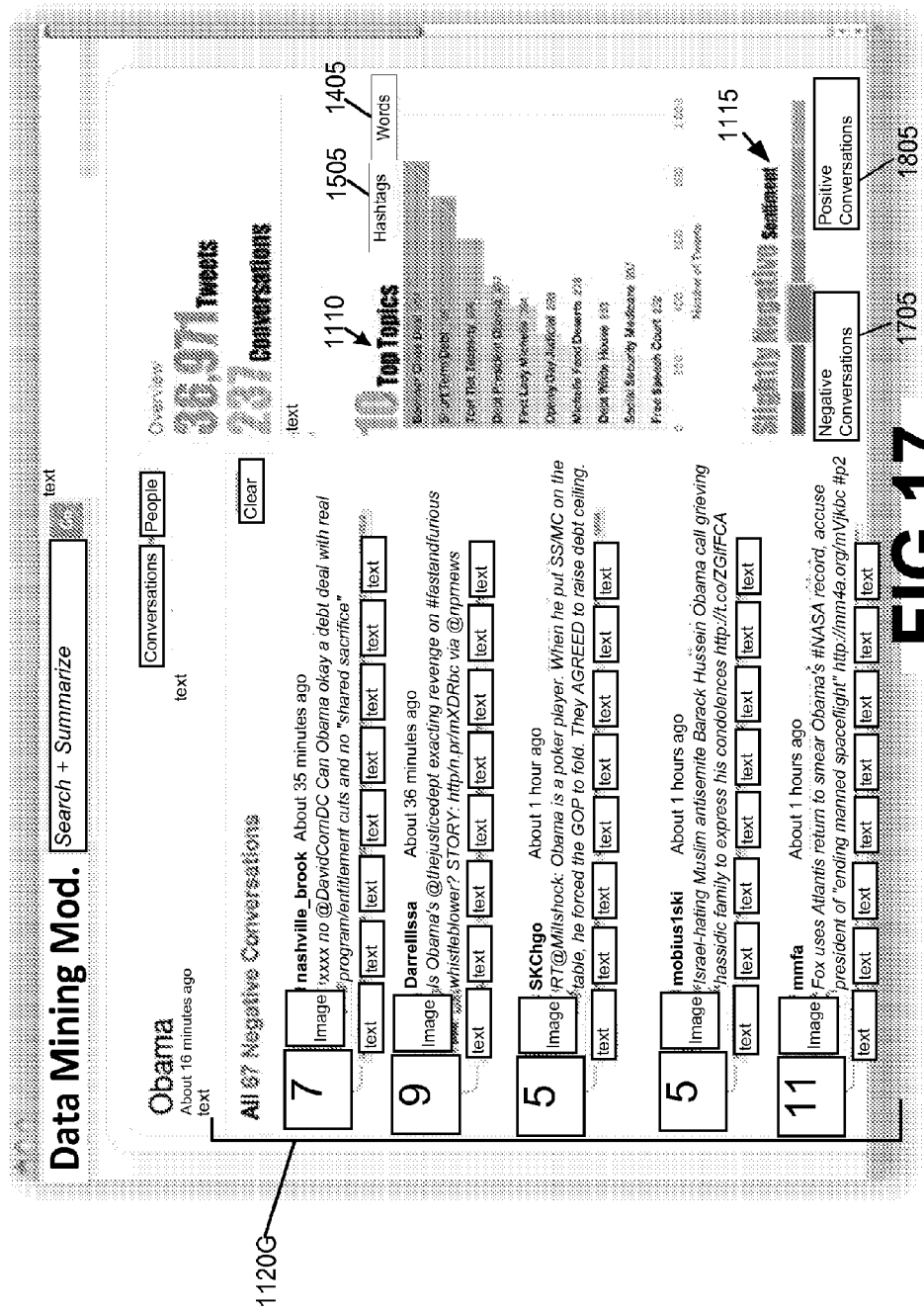
FIG. 17 is an illustration of an exemplary graphical user interface after the sentiment menu has been changed by the user from the 'Fairly Negative Sentiment' option to a 'Slightly Negative Sentiment' option of the sentiment menu compared to FIG. 16.

FIG. 17 is an illustration of an exemplary graphical user interface 1700 after the sentiment menu 1115 has been changed by the user from the 'Fairly Negative Sentiment' option to a 'Slightly Negative Sentiment' option of the sentiment menu 1115 compared to FIG. 16. The summarized message content 1120G comprises a listing of the negative conversations based on the relative slider position of the sentiment menu 1115, and in this embodiment, the 'Slightly Negative Sentiment' option which is one degree in the positive direction along the sentiment menu 1115 relative to the 'Fairly Negative Sentiment' option which is on the left side of the 'Slightly Negative Sentiment' option.

Figure 18:
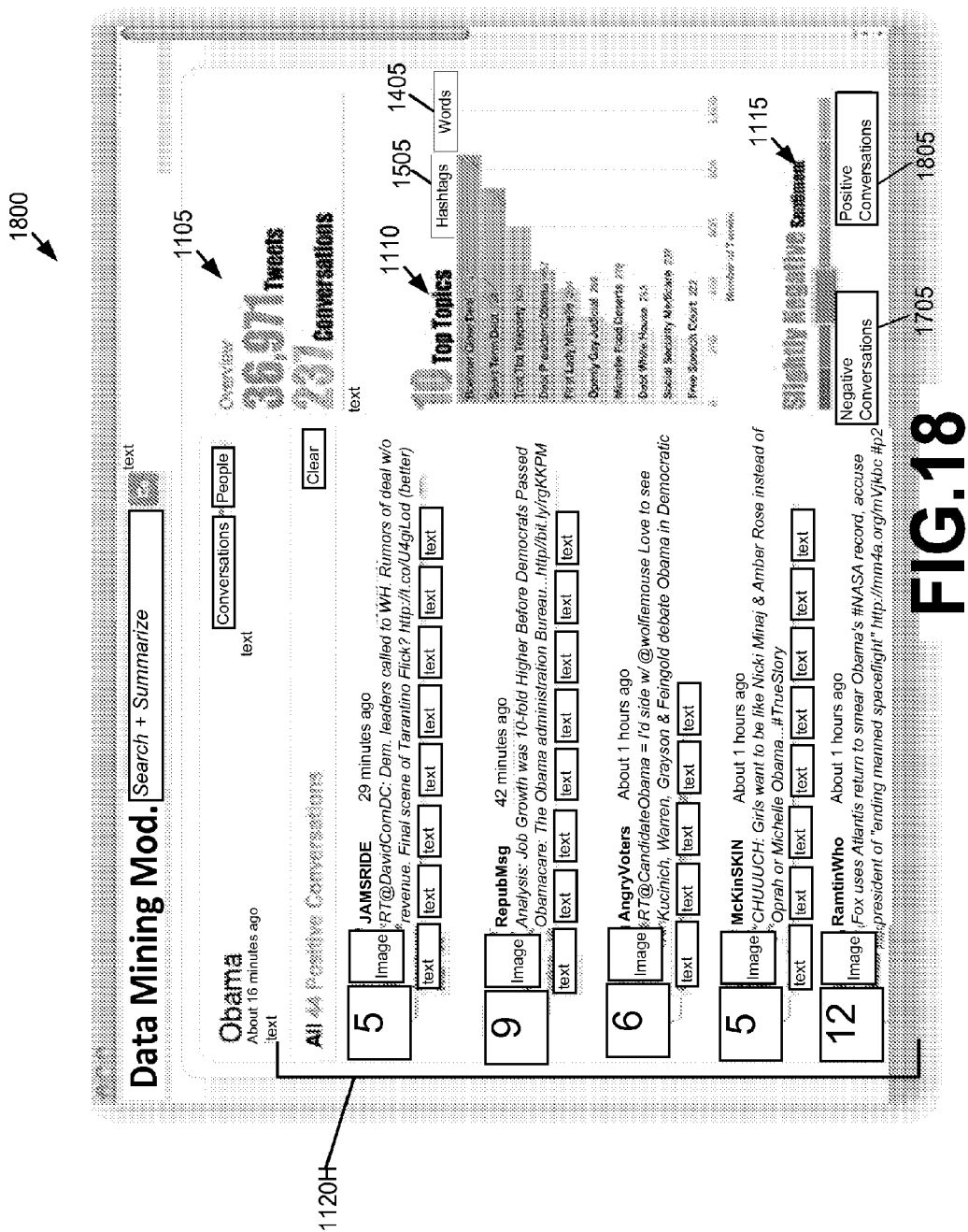
FIG. 18 is an illustration of an exemplary graphical user interface after a positive conversation option has been selected by the user.

FIG. 18 is an illustration of an exemplary graphical user interface 1800 after a positive conversation option has been selected by the user. The summarized message content 1120H comprises a listing of the positive conversations based on the relative slider position of the sentiment menu 1115 which is currently at the 'Slightly Negative Sentiment' option in this exemplary embodiment.

Figure 19:
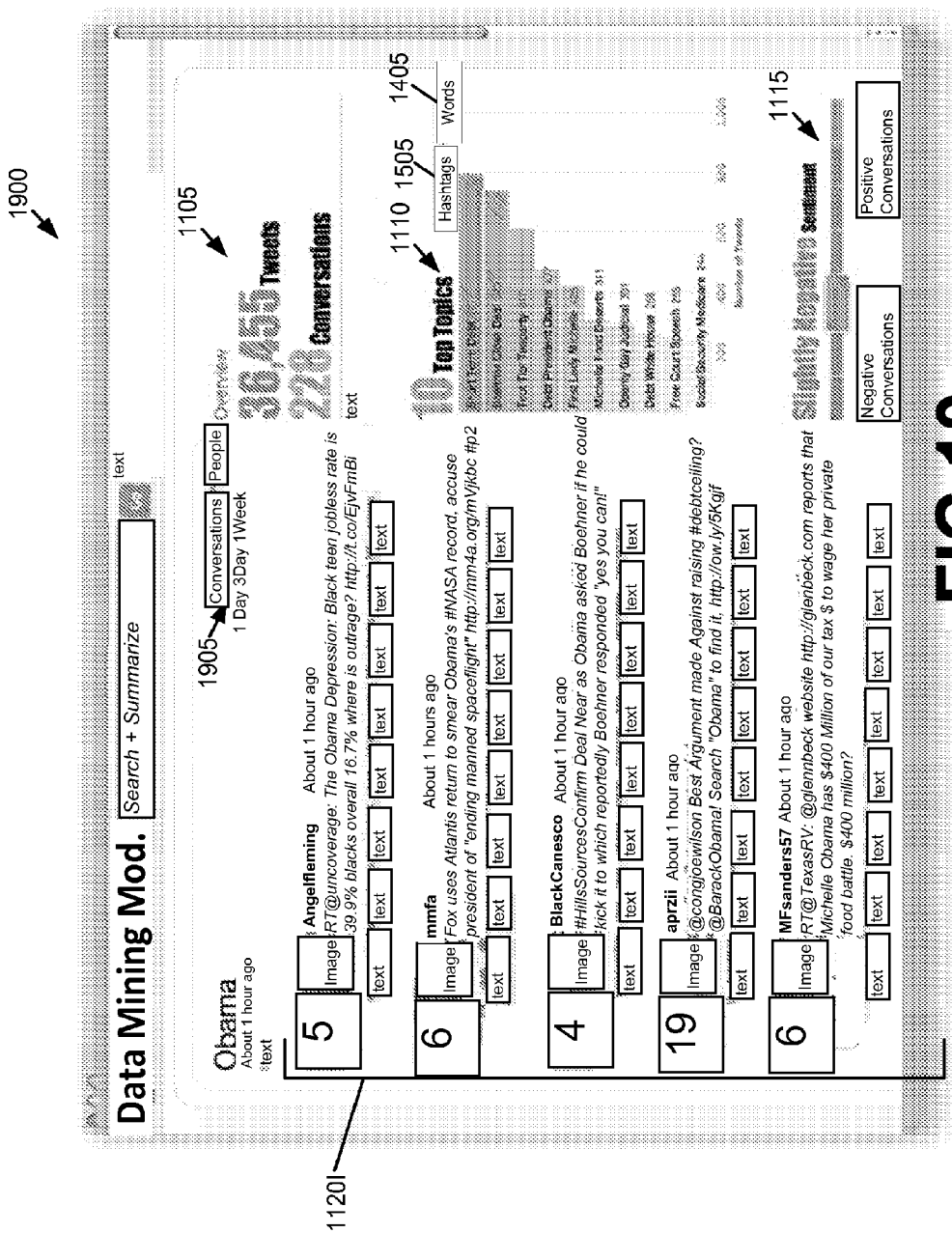
FIG. 19 illustrates an exemplary graphical user interface that comprises a display that highlights conversations rankings.

FIG. 19 illustrates an exemplary graphical user interface 1900 that comprises a display that highlights conversations rankings based on a time menu 1905 that has been selected. The summarized message content 1120I may be ranked by using different rankings scales that are selectable by a user.

Conversations (short data messages) may be ranked by how recent the conversations are relative to the current time, conversations that occurred within one day of the current time, conversations that occurred within three days of the current time, and conversations that occurred within one week of the current time, and so on. Such rankings made be made by selection a option from the time menu 1905 which lists the options of one day, three days, and one week. Other timing may be included without departing from the scope of this disclosure.

Figure 20:
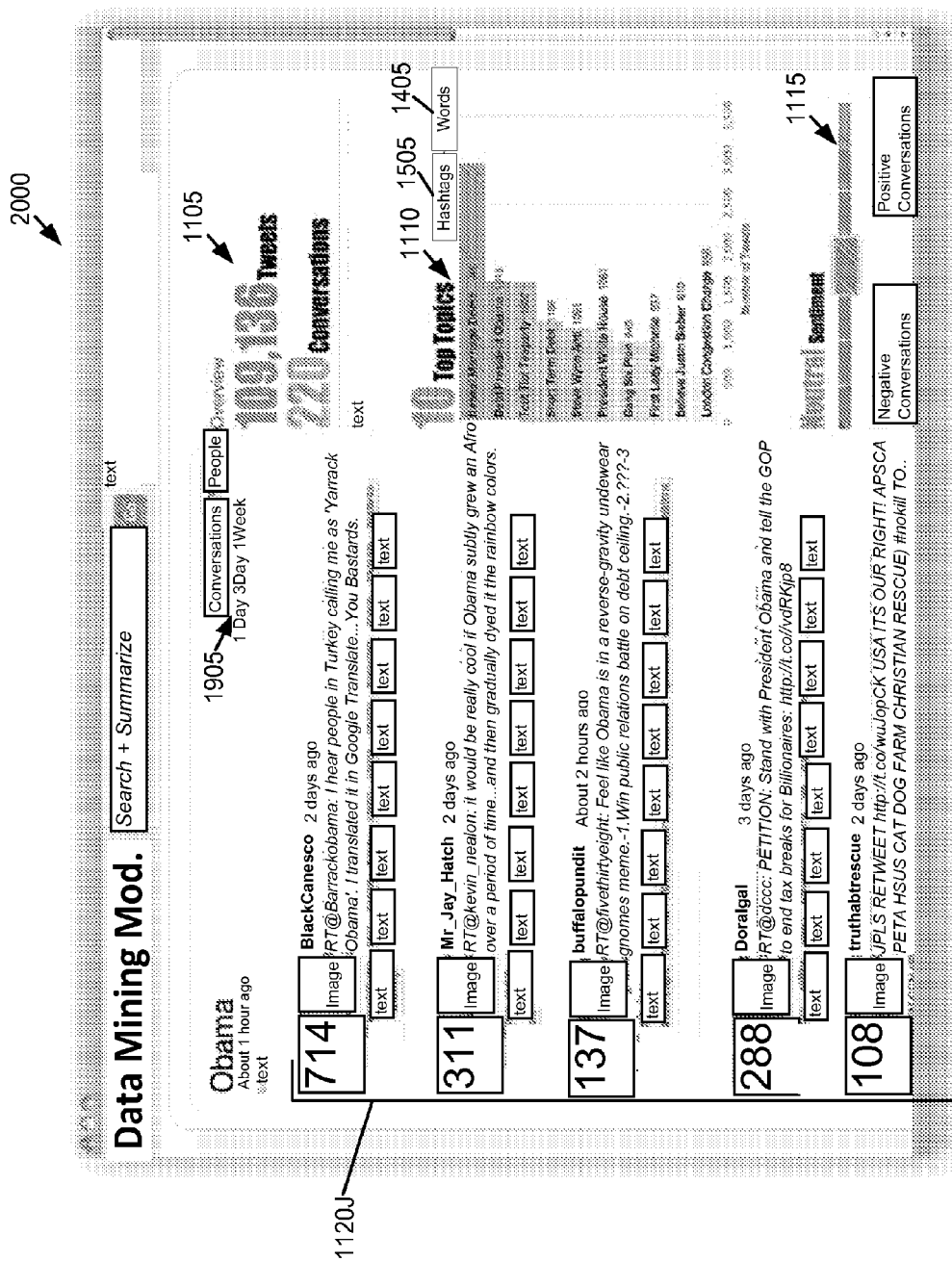
FIG. 20 is an illustration of an exemplary graphical user interface that comprises an option for summarizing content over a selected period time such as a number of days and/or weeks as selected using time menu.

FIG. 20 is an illustration of an exemplary graphical user interface 2000 that comprises an option for summarizing content over a selected period time such as a number of days and/or weeks as selected using time menu 1905. This graphical user interface 2000 illustrates that when a new ranking is selected for conversations being tracked by the summarizing module 10, then the summarizing module updates all data in accordance with the ranking that includes the summarized message content data 1120J, the overview section 1105 of user interface, and the top ten topics menu 1110, as well as the sentiment menu 1115.

Figure 21:
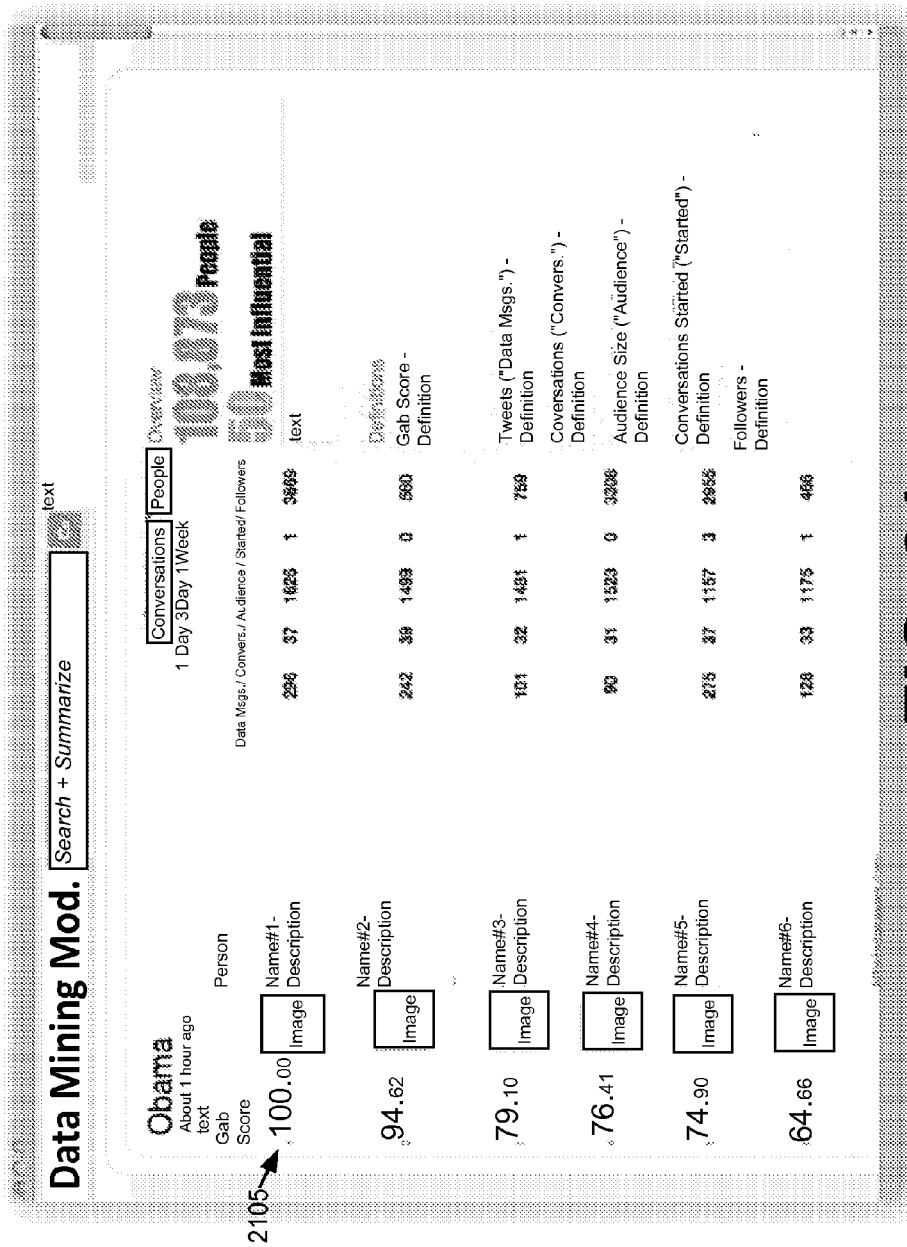
FIG. 21 illustrates an exemplary graphical user interface that comprises a display of short data message originators who are ranked based on conversation (short data message) patterns.

FIG. 21 illustrates an exemplary graphical user interface 2100 that comprises a display of short data message originators ranked based on conversation (short data message) patterns. According to this exemplary embodiment, the summarizing data module 10 may rank conversations based on the number of messages sent by a person (see "Data Msgs." column), the number of conversations originating from a particular person (see "Started" column), the size of an audience for a particular person (see "Audience" column), the number of message followers for a particular person (see "Followers" column), and a number of times a person's message appeared in other conversations (data messages) (see "Convers." column). Each of these scores is computed by the summarizing data mining module 10. Other metrics may be used to rank conversations as understood by one of ordinary skill in the art.

One score 2105 that may be computed by the summarizing data mining module 10 may comprise a unique ranking of short message users in the current search results being reviewed by the summarizing data mining module 10. The summarizing data mining module 10 may rank a person based on words and concepts originated by the person and how they matched with other people in the same results. This score 2105 may be branded such as the GABACUS™ or GAB™ score which is illustrated in the leftmost column of FIG. 21.

Figure 22:
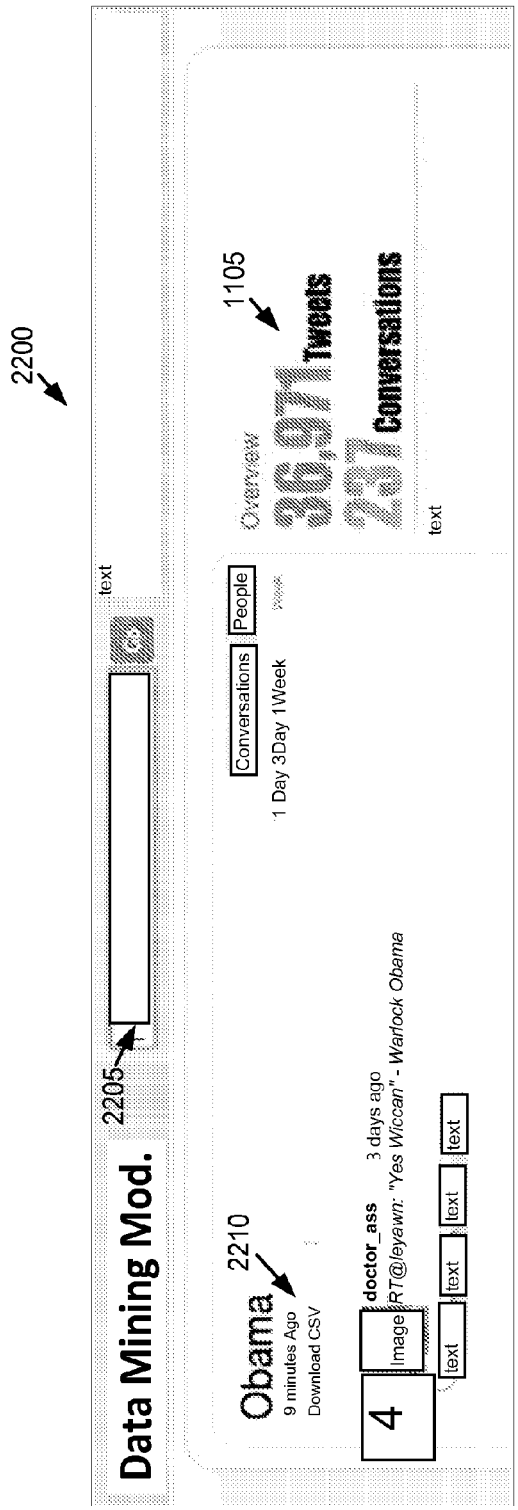
FIG. 22 is an illustration of an exemplary graphical user interface that comprises a quick search bar.

FIG. 22 is an illustration of an exemplary graphical user interface 2200 that comprises a quick search bar 2205. The quick search bar 2205 may allow a user to enter any group of words or phrases that may be used by the summarizing data mining module 10 to search across the short messaging system supported by the computer server 100C of FIG. 1B.

The graphical user interface 2200 may further comprise a menu 2210 of options for downloading content organized and computed by the summarizing module 10. For example, a user of the system 101 may be permitted to download conversations and patterns to a CSV file by selecting an option from menu 2210 as understood by one of ordinary skill in the art.

Figure 23:
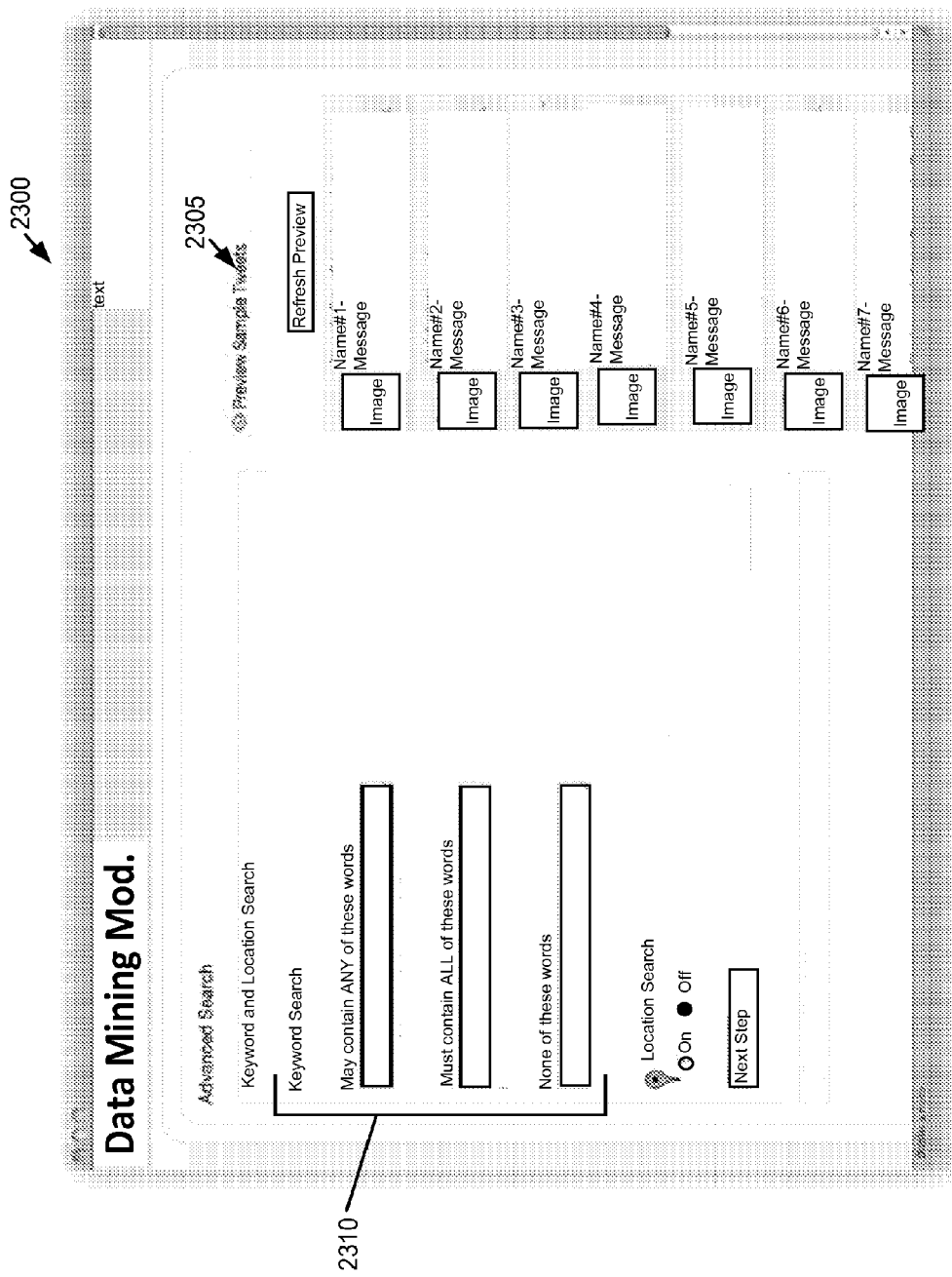
FIG. 23 is an illustration of an exemplary graphical user interface that comprises an advanced search engine with multiple optional search fields.

FIG. 23 is an illustration of an exemplary graphical user interface 2300 that comprises an advanced search engine with multiple optional search fields 2310. The fields 2310 of the advanced search engine may allow a user to enter complex queries that comprises Boolean logic search operators such as "OR", "AND", or "NOT."

The advanced search engine that uses fields 2310 may also provide a preview 2305 of a query before the query is actually started. The preview 2305 may further comprise a predicted data rate based on prior short data messages (i.e. "tweets") that have been tracked by the system 101.

Figure 24:
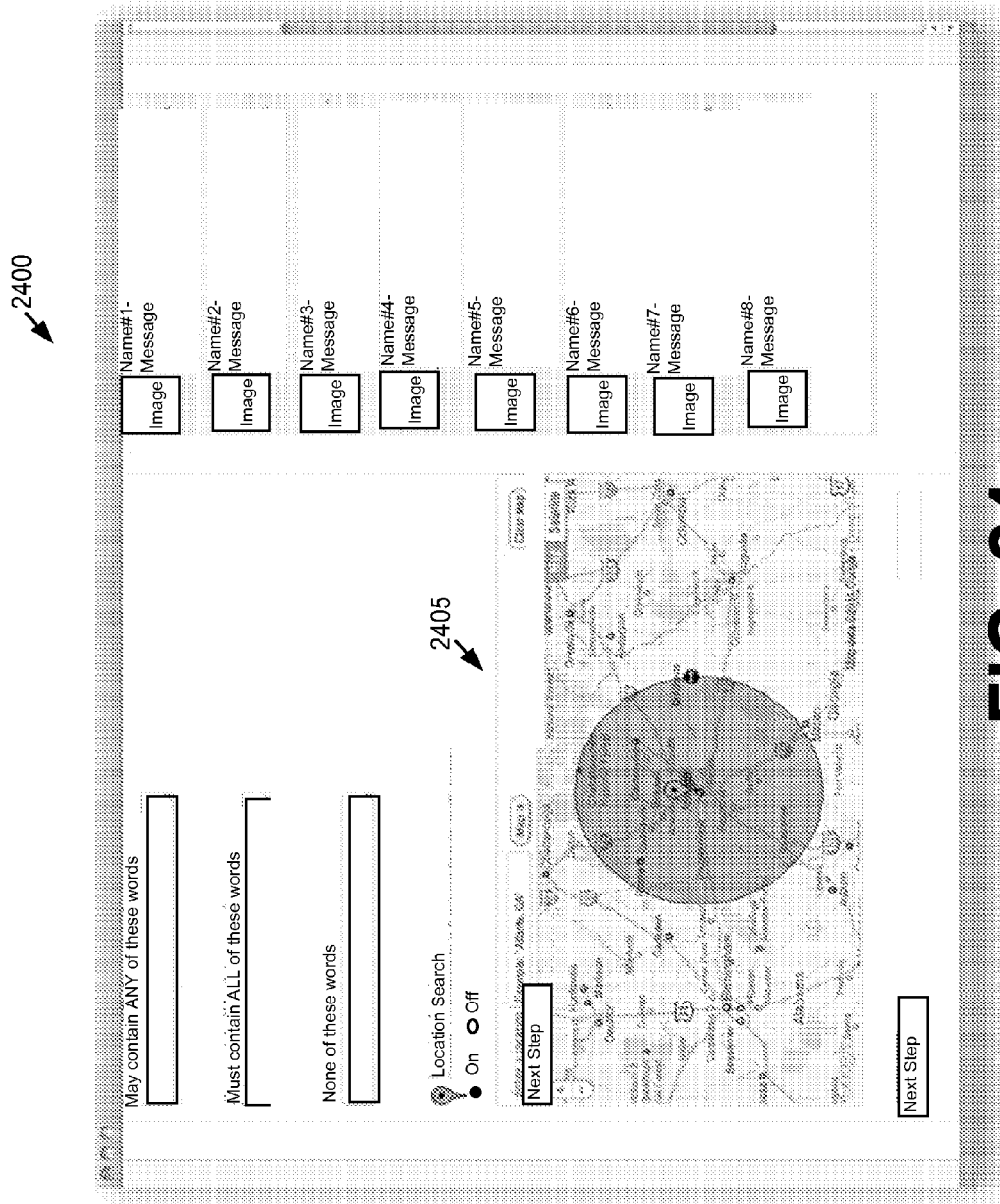
FIG. 24 illustrates an exemplary graphical user interface for conducting location-based searches of the operators who originate short data messages.

FIG. 24 illustrates an exemplary graphical user interface 2400 for conducting location-based searches of the operators who originate short data messages. The graphical user interface 2400 may comprise a selectable map 2405 in which a user may restrict searching of conversations (short data messages) based on the current location of people originating the conversations. The selectable map 2405 may comprise zoom tools so that smaller or larger geographical areas may be selected by the user for a location-based search. It is important to point out that when short data messages are selected geographically, usually no search words (terms) are required.

Figure 25:
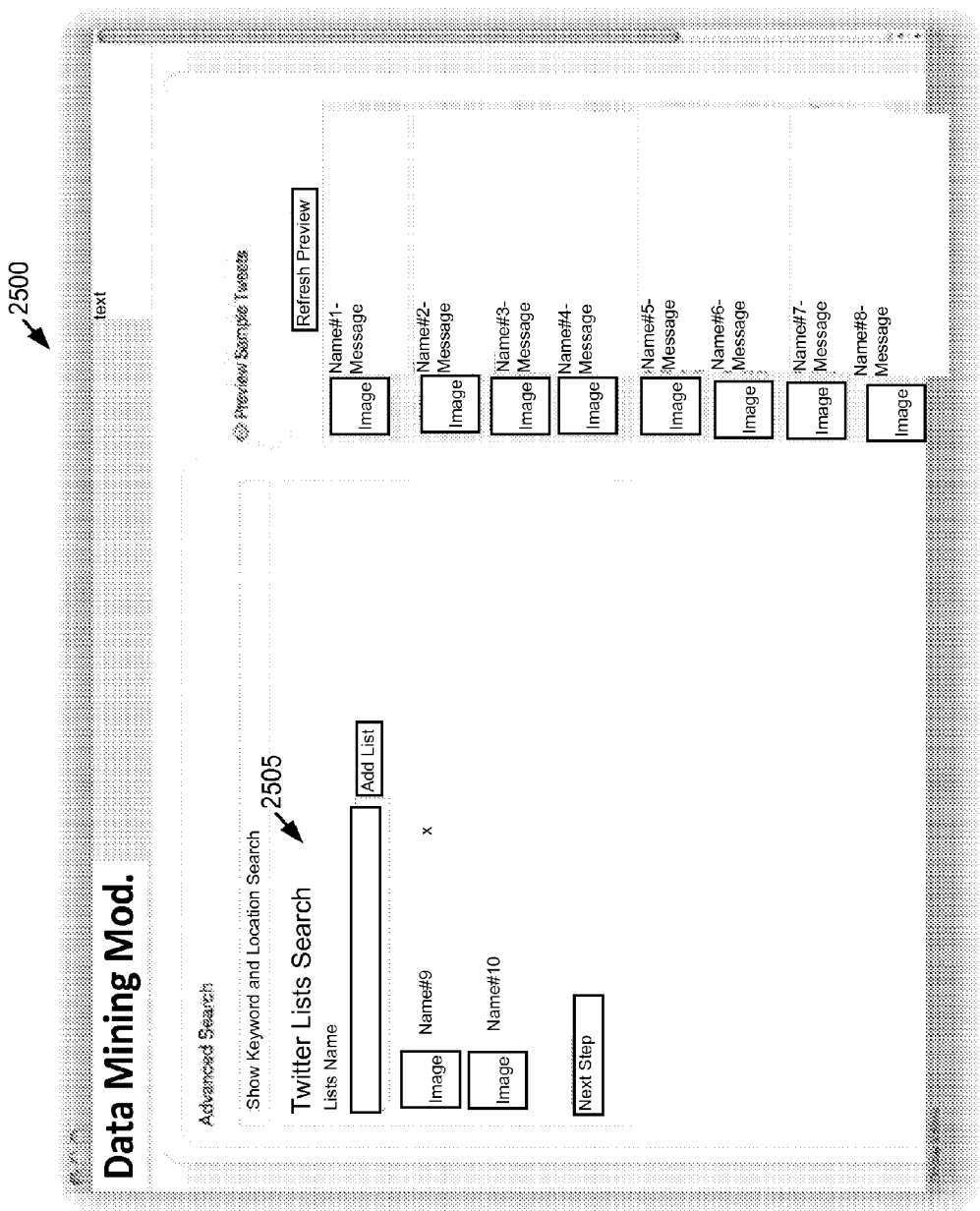
FIG. 25 is an illustration of an exemplary graphical user interface for conducting searches using a short data message account.

FIG. 25 is an illustration of an exemplary graphical user interface 2500 for conducting searches using a short data message account. In this graphical user interface 2500, a user may select rankings for conversations based on existing rankings 2505 that may be provided with the short data message account supported by the computer server 100C of FIG. 1B. In other words, the short data message account that is not managed by the summarizing data mining module 10 may have its own categories for ranking which can be imported into the system 101 that utilizes the summarizing data mining module 10. In the exemplary embodiment of FIG. 25, the existing ranking 2505 has a first category for a person with the name, "Jason_ Pollack."

Figure 26:
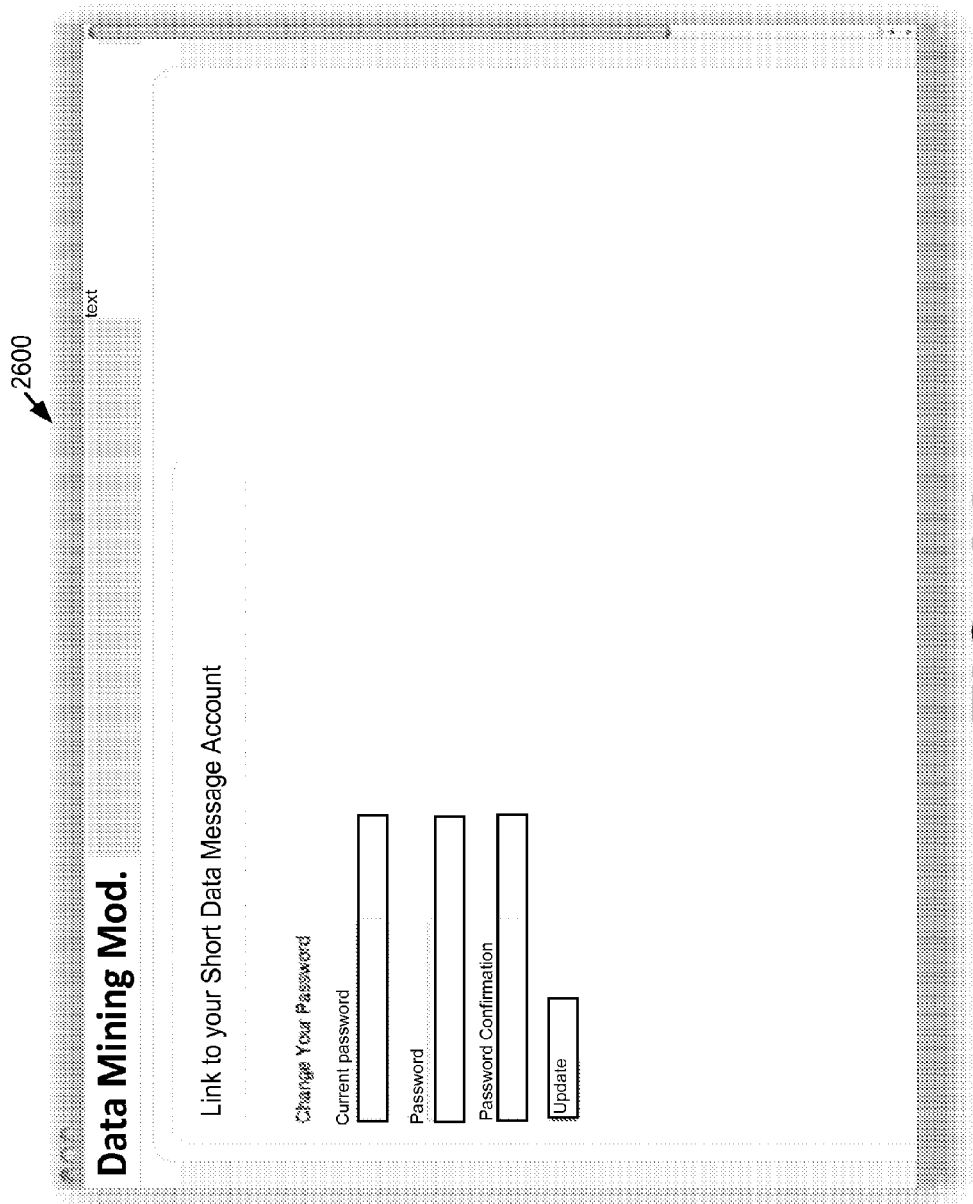
FIG. 26 is an illustration of an exemplary graphical user interface for linking the summarizing module account managed by the summarizing data mining module with the short data message account.

FIG. 26 is an illustration of an exemplary graphical user interface 2600 for linking the summarizing module account managed by the summarizing data mining module 10 with the short data message account. This graphical user interface 2600 further comprises a password reset option 2610 so that the user may reset their password to the summarizing module account managed by the summarizing data mining module 10.

Although selected aspects have been illustrated and described in detail, it will be understood that various substitutions and alterations may be made therein without departing from the spirit and scope of the present invention. Many modifications and other embodiments of the inventions set forth herein will come to mind to one of ordinary skill in the art to which these inventions pertain having the benefit of the teachings presented in the foregoing descriptions and the associated drawings.

For example, the system 101 may be used to optimize product configurations based on customer buying patterns used as the input instead of short data messages. The system 101 may help reduce product configurations, such as by 70%, while still satisfying demand of the customer base.

The system 101 may be used to analyze buying patterns from multichannel sales in order to produce key product affinities. As a result, the system 101 may increase basket size without human intervention and which allows a catalog to grow organically while related items may be stocked together.

The system 101 may analyze sale patterns on transactions in aftermarket parts across multiple channels to determine kits/project-based buying. The system 101 may help the aftermarket parts industry to increase their transaction sizes, increased customer spending by guiding the consumer to a full project, and increase consistency across all stores and channels of the aftermarket parts chain.

The system 101 be used in hospitals in order to leverage nurses stations and/or room demand in order to drive direct cost planning for hospitals. The system 101 may be used in the medical device field to analyze the transaction streams for replenishment for operating rooms and or hospitals. The system 101 may analyze patterns of use in order to bundle or kit medical devices together. The system 101 may plan lifecycle costs while reducing inventory.

Therefore, although selected aspects have been illustrated and described in detail, it will be understood that various substitutions and alterations may be made therein without departing from the spirit and scope of the present invention, as defined by the following claims.

What is claimed is:

1. A computer-implemented method for summarizing a message stream, method comprising the steps of:
   defining a communications channel with one or more key words, wherein defining the communications channel comprises specifying one or more key words that are used to extract a message from the message stream, the message stream comprising at least two messages;

extracting one or more messages from the message stream based on the defined channel, wherein extracting one or more messages from the message stream based on the defined channel comprises filtering one or more messages from the message stream using the defined channel as a filter for selecting a message to be extracted for additional processing;

removing common words from the one or more extracted messages;

building a word order graph for the one or more extracted messages, the word order graph tracking sequencing of words found within each extracted message;

using an algorithm to find commonly occurring word clusters within each extracted message, wherein the algorithm reviews each extracted message for at least two-word clusters with a predetermined pair-frequency, the pair-frequency comprising a number of times that words appear together in an extracted message;

pruning the word clusters to reduce a total number of word clusters;

ranking one or more surviving clusters to determine an order of presentation;

arranging each word cluster into a natural order based on the word order graph; and displaying the word clusters as a summary of the message stream.

2. The computer-implemented method of claim 1, further comprising grouping the word clusters that have been extracted from message stream into topics.

3. The computer-implemented method of claim 1, further comprising listing an identity of one or more message originators based on their influence on the messages being analyzed.

4. The computer-implemented method of claim 1, further comprising defining a communications channel based on a geographical location of one or more originators of messages.

5. The computer-implemented method of claim 4, further comprising displaying a map that is selectable for restricting messages based on a selected location from the map.

6. The computer-implemented method of claim 1, wherein pruning the word clusters to reduce their size comprises a plurality of pruning levels.

7. The computer-implemented method of claim 1, wherein pruning the word clusters to reduce their size comprises at least one of subset pruning, superset pruning, and bipartite pruning.

8. The computer-implemented method of claim 1, wherein building a word order graph comprises determining a frequency of a number of times a pair of words and their sequence exist in a set of messages being analyzed.

9. The computer-implemented method of claim 1, where messages of the message stream have a predefined length.

10. The computer-implemented method of claim 9, wherein the predefined length comprises about two-hundred words or less.

11. A computer-implemented system comprising:

means for defining a communications channel with one or more key words, wherein the means for defining the communications channel with one or more key words comprises means for specifying one or more key words that are used to extract a message from the message stream, the message stream comprising at least two messages;

means for extracting one or more messages from the message stream based on the defined channel, wherein the means for extracting the one or more messages from the message stream based on the defined channel comprises means for filtering one or more messages from the message stream using the defined channel as a filter for selecting a message to be extracted for additional processing;

means for removing common words from the one or more extracted messages;

means for building a word order graph for the one or more extracted messages, the word order graph tracking sequencing of words found within each extracted message;

means for using an algorithm to find commonly occurring word clusters within each extracted message, wherein the algorithm reviews each extracted message for at least two-word clusters with a predetermined pair-frequency, the pair-frequency comprising a number of times that words appear together in an extracted message;

means for pruning the word clusters to reduce a total number of word clusters;

means for ranking one or more surviving clusters to determine an order of presentation;

means for arranging each word cluster into a natural order based on the word order graph; and means for displaying the word clusters as a summary of the message stream.

12. The computer-implemented system of claim 11, further comprising means for grouping the word clusters that have been extracted from message stream into topics.

13. The computer-implemented system of claim 11, further comprising means for listing an identity of one or more message originators based on their influence on the messages being analyzed.

14. The computer-implemented method of system 11, further comprising means for defining a communications channel based on a geographical location of one or more originators of messages.

15. The computer-implemented system of claim 14, further comprising means for displaying a map that is selectable for restricting messages based on a selected location from the map.

16. The computer-implemented system of claim 11, wherein the means for pruning the word clusters to reduce their size comprises a plurality of pruning levels.

17. A computer program product comprising a tangible computer usable medium having a computer readable program code embodied therein, said tangible computer readable program code adapted to be executed to implement a method for summarizing a message stream, said method comprising:

defining a communications channel with one or more key words, wherein defining the communications channel comprises specifying one or more key words that are used to extract a message from the message stream, the message stream comprising at least two messages;

extracting one or more messages from the message stream based on the defined channel, wherein extracting one or more messages from the message stream based on the defined channel comprises filtering one or more messages from the message stream using the defined channel as a filter for selecting a message to be extracted for additional processing;

removing common words from the one or more extracted messages;

building a word order graph for the one or more extracted messages, the word order graph tracking sequencing of words found within each extracted message;

using an algorithm to find commonly occurring word clusters within each extracted message, wherein the algorithm reviews each extracted message for at least two-word clusters with a predetermined pair-frequency, the pair-frequency comprising a number of times that words appear together in an extracted message;

pruning the word clusters to reduce their size a total number of word clusters;

ranking one or more surviving clusters to determine an order of presentation;

arranging each word cluster into a natural order based on the word order graph; and displaying the word clusters as a summary of the message stream.

18. The computer program product of claim 17, wherein the program code implementing the method further comprises: grouping the word clusters that have been extracted from message stream into topics.

19. The computer program product of claim 17, wherein the program code implementing the method further comprises: listing an identity of one or more message originators based on their influence on the messages being analyzed.

20. The computer program product of claim 17, wherein the program code implementing the method further comprises: defining a communications channel based on a geographical location of one or more originators of messages.

\* \* \* \* \*